US012779580B2

(12) United States Patent
Shapiro et al.

(10) Patent No.: US 12,779,580 B2
(45) Date of Patent: Nov. 3, 2026

(54) VISUAL PREVIEW FOR LASER FABRICATION

(71) Applicant: MAKEBLOCK HONGKONG HOLDING LIMITED, Hong Kong (CN)

(72) Inventors: Daniel Shapiro, Mercer Island, WA (US); Mark Gosselin, Seattle, WA (US); Anthony Wright, Seattle, WA (US); Dean Putney, Seattle, WA (US); Timothy Ellis, Everett, WA (US); Lauren Banka, Seattle, WA (US)

(73) Assignee: MAKEBLOCK HONGKONG HOLDING LIMITED, Hong Kong (CN)

( * ) Notice: Subject to any disclaimer, the term of this patent is extended or adjusted under 35 U.S.C. 154(b) by 907 days.

(21) Appl. No.: 18/086,652

(22) Filed: Dec. 22, 2022

(65) Prior Publication Data

US 2023/0281279 A1 Sep. 7, 2023

Related U.S. Application Data

(63) Continuation of application No. 16/691,429, filed on Nov. 21, 2019, now Pat. No. 11,537,097, which is a (Continued)

(51) Int. Cl.
*B23K 26/03* (2006.01)
*B23K 10/00* (2006.01)
(Continued)

(52) U.S. Cl.
CPC .......... *B23K 26/032* (2013.01); *B23K 10/006* (2013.01); *B23K 26/08* (2013.01);
(Continued)

(58) Field of Classification Search
CPC .... B23K 26/032; B23K 10/006; B23K 26/08; B23K 26/082; B23K 26/0853;
(Continued)

(56) References Cited

U.S. PATENT DOCUMENTS 3,721,811 A 3/1973 Taylor et al.
3,967,176 A 6/1976 Wagener et al.
(Continued)

FOREIGN PATENT DOCUMENTS

CN 1364033 A 8/2002
CN 101095033 A 12/2007
(Continued)

OTHER PUBLICATIONS

Dazhong Wu et al. "Cloud Manufacturing: Drivers, Current Status, and Future Trends." vol. 2. Systems; Micro and Nano Technologies Sustainable Manufacturing. Jun. 10, 2013. [Retrieved on May 10, 2016.] pp. 1-10.
(Continued)

*Primary Examiner* — Alicia M. Choi
(74) *Attorney, Agent, or Firm* — PV IP PC; Wei Te Chung

(57) ABSTRACT

A computer numerically controlled machine may include a movable head configured to deliver electromagnetic energy to a part of a working area in which the movable head may be commanded to cause delivery of the electromagnetic energy. The interior space may be defined by a housing and may include an openable barrier that attenuates transmission of light between the interior space and an exterior of the computer numerically controlled machine when the openable barrier is in a closed position. The computer numerically controlled machine may include an interlock that prevents emission of the electromagnetic energy when detecting that the openable barrier is not in the closed
(Continued)

position. The commanding may result in the computer numerically controlled machine executing operations of a motion plan for causing movement of the movable head to deliver the electromagnetic energy to effect a change in a material at least partially contained within the interior space.

20 Claims, 16 Drawing Sheets

Related U.S. Application Data continuation of application No. 15/334,095, filed on Oct. 25, 2016, now Pat. No. 10,520,915, which is a continuation of application No. PCT/US2016/017900, filed on Feb. 12, 2016.

(60) Provisional application No. 62/222,757, filed on Sep. 23, 2015, provisional application No. 62/222,756, filed on Sep. 23, 2015, provisional application No. 62/222,758, filed on Sep. 23, 2015, provisional application No. 62/115,571, filed on Feb. 12, 2015, provisional application No. 62/115,562, filed on Feb. 12, 2015.

(51) Int. Cl.

| | |
|---|---|
| ***B23K 26/08*** | (2014.01) |
| ***B23K 26/082*** | (2014.01) |
| ***B23K 26/38*** | (2014.01) |
| ***B23K 37/02*** | (2006.01) |
| ***B23K 37/04*** | (2006.01) |
| ***B23Q 17/22*** | (2006.01) |
| ***G05B 19/18*** | (2006.01) |
| ***G05B 19/402*** | (2006.01) |
| ***G05B 19/406*** | (2006.01) |
| ***G06F 21/12*** | (2013.01) |
| *B33Y 50/00* | (2015.01) |

(52) U.S. Cl.

CPC ........ *B23K 26/082* (2015.10); *B23K 26/0853* (2013.01); *B23K 26/0876* (2013.01); *B23K 26/38* (2013.01); *B23K 37/0211* (2013.01); *B23K 37/0235* (2013.01); *B23K 37/0408* (2013.01); *B23Q 17/22* (2013.01); *G05B 19/18* (2013.01); *G05B 19/402* (2013.01); *G05B 19/406* (2013.01); *G06F 21/121* (2013.01); *B33Y 50/00* (2014.12); *G05B 2219/31186* (2013.01); *G05B 2219/32001* (2013.01); *G05B 2219/36053* (2013.01); *G05B 2219/36199* (2013.01); *G05B 2219/37359* (2013.01); *G05B 2219/37555* (2013.01); *G05B 2219/42307* (2013.01); *G05B 2219/45041* (2013.01); *G05B 2219/45212* (2013.01); *Y02P 80/40* (2015.11); *Y02P 90/80* (2015.11)

(58) Field of Classification Search

CPC ................ B23K 26/0876; B23K 26/38; B23K 37/0211; B23K 37/0235; B23K 37/0408; B23K 26/00; B23K 26/702; B23Q 17/22; G05B 19/18; G05B 19/402; G05B 19/406; G05B 2219/31186; G05B 2219/32001; G05B 2219/36053; G05B 2219/36199; G05B 2219/37359; G05B 2219/37555; G05B 2219/42307; G05B 2219/45041; G05B 2219/45212; G05B 19/401; G05B 19/409; G05B 19/4097; G05B 19/414; G05B 19/40937; G05B 19/408; G06F 21/121; B33Y 50/00; Y02P 80/40; Y02P 90/80; B27M 1/08; B29C 64/393

See application file for complete search history.

(56) References Cited

U.S. PATENT DOCUMENTS

| | | | | |
|---|---|---|---|---|
| 4,055,787 | A | 10/1977 | Beadle et al. | |
| 4,138,718 | A | 2/1979 | Toke et al. | |
| 4,383,762 | A | 5/1983 | Burkert | |
| 4,518,843 | A | 5/1985 | Antol et al. | |
| 4,589,729 | A | 5/1986 | Bridges et al. | |
| 4,650,287 | A | 3/1987 | Kudo et al. | |
| 4,723,219 | A | 2/1988 | Beyer et al. | |
| 4,863,538 | A | 9/1989 | Deckard | |
| 4,894,831 | A | 1/1990 | Alfrey | |
| 4,901,359 | A | 2/1990 | Bruder | |
| 4,918,611 | A | 4/1990 | Shyu et al. | |
| 4,998,260 | A | 3/1991 | Taniura | |
| 5,136,160 | A | 8/1992 | Nakane et al. | |
| 5,298,843 | A | 3/1994 | Miyajima et al. | |
| 5,355,250 | A | 10/1994 | Grasso et al. | |
| 5,396,279 | A | 3/1995 | Vossen | |
| 5,475,521 | A | 12/1995 | Heidemann | |
| 5,572,433 | A * | 11/1996 | Falconer | B65H 23/046 226/28 |
| 5,585,018 | A | 12/1996 | Kanaoka et al. | |
| 5,682,319 | A | 10/1997 | Boland et al. | |
| 5,756,961 | A | 5/1998 | Sato et al. | |
| 6,031,200 | A | 2/2000 | Whitehouse | |
| 6,085,122 | A | 7/2000 | Manning | |
| 6,087,625 | A | 7/2000 | Iso | |
| 6,284,999 | B1 | 9/2001 | Virtanen et al. | |
| 6,326,586 | B1 | 12/2001 | Heyerick et al. | |
| 6,420,674 | B1 | 7/2002 | Cole, III et al. | |
| 6,420,675 | B1 | 7/2002 | Lizotte et al. | |
| 6,459,951 | B1 * | 10/2002 | Griffith | B23K 26/032 700/118 |
| 6,483,596 | B1 | 11/2002 | Philippi et al. | |
| 6,498,653 | B1 | 12/2002 | Wang | |
| 6,528,758 | B2 | 3/2003 | Shaffer | |
| 6,609,044 | B1 | 8/2003 | Basista et al. | |
| 6,628,322 | B1 | 9/2003 | Cerruti | |
| 6,696,667 | B1 | 2/2004 | Flanagan | |
| 7,456,372 | B2 | 11/2008 | Hiramatsu | |
| 7,667,160 | B2 * | 2/2010 | Hiramatsu | B23K 26/0622 219/121.7 |
| 8,111,904 | B2 | 2/2012 | Wallack et al. | |
| 8,136,432 | B2 | 3/2012 | Travez et al. | |
| 8,786,928 | B2 | 7/2014 | Dolleris et al. | |
| 8,809,780 | B2 | 8/2014 | Wollenhaupt et al. | |
| 8,921,734 | B2 | 12/2014 | Yerazunis et al. | |
| 9,020,628 | B2 | 4/2015 | Fagan | |
| 9,114,478 | B2 | 8/2015 | Scott et al. | |
| 9,235,205 | B2 | 1/2016 | Prestidge et al. | |
| 9,469,338 | B2 | 10/2016 | Norberg Ohlsson | |
| 9,618,926 | B1 | 4/2017 | Louette et al. | |
| 9,734,419 | B1 | 8/2017 | Ye et al. | |
| 9,772,067 | B2 | 9/2017 | Bunz et al. | |
| 9,912,915 | B2 | 3/2018 | Sinclair | |
| 9,987,798 | B2 | 6/2018 | Tyler | |
| 10,234,260 | B2 | 3/2019 | Siercks et al. | |
| 2001/0012973 | A1 | 8/2001 | Wehrli et al. | |
| 2002/0005958 | A1 | 1/2002 | Sekiya | |
| 2002/0129485 | A1 | 9/2002 | Mok et al. | |
| 2002/0144987 | A1 | 10/2002 | Tomlinson et al. | |
| 2003/0049373 | A1 | 3/2003 | Van De Rijdt et al. | |
| 2004/0029493 | A1 | 2/2004 | Tricard et al. | |
| 2004/0060910 | A1 | 4/2004 | Schramm | |
| 2004/0087152 | A1 | 5/2004 | Lian et al. | |
| 2004/0207831 | A1 | 10/2004 | Aoyama | |
| 2004/0223165 | A1 | 11/2004 | Kurokawa et al. | |
| 2004/0245227 | A1 | 12/2004 | Grafton-Reed et al. | |
| 2004/0258274 | A1 * | 12/2004 | Brundage | G07D 7/207 382/100 |
| 2005/0051523 | A1 | 3/2005 | Legge et al. | |
| 2005/0069682 | A1 | 3/2005 | Tseng | |

(56) References Cited

U.S. PATENT DOCUMENTS

2005/0071020 A1 3/2005 Yamazaki et al.
2005/0115941 A1 6/2005 Sukhman et al.
2005/0142701 A1 6/2005 Yamaguchi et al.
2005/0187651 A1 8/2005 Kimura et al.
2005/0222705 A1* 10/2005 Budd ................. G01B 11/2433 700/175
2006/0022379 A1 2/2006 Wicker et al.
2006/0043615 A1 3/2006 Zheng et al.
2007/0000889 A1 1/2007 Yamazaki et al.
2007/0032733 A1 2/2007 Burton
2007/0034615 A1 2/2007 Kleine
2007/0181544 A1 8/2007 Sukhman et al.
2007/0228100 A1* 10/2007 Gonoe ................... B23K 26/40 225/93.5
2007/0248350 A1 10/2007 Baker et al.
2008/0058734 A1 3/2008 Hanft et al.
2008/0100829 A1 5/2008 Watson
2008/0101687 A1 5/2008 Goeller
2008/0149604 A1 6/2008 Varriano-Marston et al.
2008/0160254 A1 7/2008 Arnold
2008/0218735 A1 9/2008 Atsumi et al.
2008/0243299 A1 10/2008 Johnson et al.
2008/0249653 A1 10/2008 Ichikawa
2008/0296315 A1 12/2008 Read
2008/0314878 A1* 12/2008 Cai ......................... B22F 10/80 700/67
2009/0005631 A1 1/2009 Simenhaus et al.
2009/0060386 A1 3/2009 Cooper et al.
2009/0120914 A1 5/2009 Lawrence
2009/0250445 A1 10/2009 Yamaguchi et al.
2009/0308851 A1 12/2009 Harnisch et al.
2009/0308854 A1 12/2009 Wen et al.
2009/0316965 A1 12/2009 Mailling et al.
2010/0063603 A1 3/2010 Chandhoke
2010/0081971 A1 4/2010 Allison
2010/0149337 A1 6/2010 Porcino
2010/0193482 A1 8/2010 Ow et al.
2010/0193483 A1 8/2010 Chen et al.
2010/0262590 A1 10/2010 Holt
2010/0271670 A1 10/2010 Haendler et al.
2010/0274379 A1 10/2010 Hehl
2010/0292947 A1 11/2010 Buk
2010/0301023 A1 12/2010 Unrath et al.
2010/0326962 A1 12/2010 Calla et al.
2011/0005458 A1 1/2011 Cunningham
2011/0080476 A1 4/2011 Dinauer et al.
2011/0108533 A1 5/2011 Boettcher et al.
2011/0127333 A1 6/2011 Veksland et al.
2011/0127697 A1 6/2011 Milne
2011/0135208 A1 6/2011 Atanassov et al.
2011/0193943 A1 8/2011 Campbell
2011/0286007 A1 11/2011 Pangrazio et al.
2011/0316977 A1 12/2011 Pienaar
2012/0026249 A1 2/2012 Kihira et al.
2012/0035745 A1 2/2012 Mori et al.
2012/0109590 A1 5/2012 Trainer et al.
2012/0117787 A1 5/2012 Sun et al.
2012/0120232 A1 5/2012 Nishikawa
2012/0197427 A1 8/2012 Gallucci et al.
2012/0229663 A1 9/2012 Nelson et al.
2012/0293821 A1 11/2012 Chiba
2013/0158957 A1 6/2013 Lee et al.
2013/0178972 A1 7/2013 Goldsmith et al.
2013/0190898 A1 7/2013 Shilpiekandula et al.
2013/0200053 A1 8/2013 Bordatchev
2013/0211391 A1 8/2013 BenYakar et al.
2013/0304248 A1 11/2013 Lange et al.
2014/0005804 A1 1/2014 Brand
2014/0018779 A1 1/2014 Worrell et al.
2014/0032706 A1 1/2014 Kuscher et al.
2014/0039707 A1 2/2014 Curtis et al.
2014/0046131 A1 2/2014 Morita et al.
2014/0071330 A1 3/2014 Zhang et al.
2014/0071486 A1 3/2014 Van Bauwel
2014/0071502 A1 3/2014 Liu
2014/0123458 A1* 5/2014 Fearon .................... B23P 25/00 29/407.05
2014/0160273 A1 6/2014 Jedynak et al.
2014/0168293 A1 6/2014 Moreau et al.
2014/0168302 A1 6/2014 Ngo et al.
2014/0268607 A1 9/2014 Wicker et al.
2014/0299586 A1 10/2014 Sawabe et al.
2014/0310122 A1 10/2014 Danielson et al.
2014/0327687 A1 11/2014 Murakami
2014/0330424 A1 11/2014 Garaas et al.
2014/0368348 A1 12/2014 Lin
2014/0371895 A1 12/2014 Sadusk et al.
2015/0030821 A1 1/2015 Costin, Sr. et al.
2015/0107033 A1 4/2015 Chang et al.
2015/0108095 A1 4/2015 Kruer et al.
2015/0112470 A1 4/2015 Chang et al.
2015/0127137 A1 5/2015 Brandt et al.
2015/0136949 A1 5/2015 De Nooii et al.
2015/0154453 A1 6/2015 Wilf
2015/0158121 A1 6/2015 Di Cairano et al.
2015/0158311 A1 6/2015 Ogasawara et al.
2015/0197064 A1 7/2015 Walker et al.
2015/0212421 A1 7/2015 Devilliers et al.
2015/0224600 A1* 8/2015 Spiess .................. B23K 26/032 219/121.72
2015/0228069 A1 8/2015 Fresquet et al.
2015/0245549 A1 8/2015 Kurita et al.
2015/0301327 A1 10/2015 Okugawa et al.
2015/0301444 A1 10/2015 Singh et al.
2015/0355621 A1 12/2015 Ikeda et al.
2015/0360318 A1 12/2015 Aubry
2015/0378348 A1 12/2015 Gupta et al.
2016/0023486 A1 1/2016 Priyadarshi
2016/0059371 A1 3/2016 Chang et al.
2016/0084649 A1 3/2016 Yamazaki et al.
2016/0093540 A1 3/2016 Liu et al.
2016/0147213 A1 5/2016 Murakami
2016/0151114 A1* 6/2016 Gu ......................... B23K 26/70 606/11
2016/0156771 A1 6/2016 Lee
2016/0193698 A1 7/2016 Hildebrand et al.
2016/0199945 A1 7/2016 Mcdowell et al.
2016/0210737 A1 7/2016 Straub et al.
2016/0271718 A1 9/2016 Fagan
2016/0303845 A1 10/2016 Arce
2016/0325541 A1 11/2016 Lavrentyev et al.
2016/0349038 A1 12/2016 Ohtsuka et al.
2016/0360409 A1 12/2016 Singh
2016/0367336 A1 12/2016 Lv et al.
2016/0372349 A1 12/2016 Hyakumura
2017/0008127 A1 1/2017 Hyatt et al.
2017/0045877 A1 2/2017 Shapiro et al.
2017/0045879 A1 2/2017 Yang et al.
2017/0046605 A1* 2/2017 Asthana ............... G06K 7/1417
2017/0051429 A1 2/2017 Sachs et al.
2017/0057008 A1 3/2017 Liu et al.
2017/0129180 A1* 5/2017 Coates ................... B23K 26/16
2017/0173888 A1 6/2017 Thomas-Lepore et al.
2017/0203390 A1 7/2017 Kato
2017/0235293 A1 8/2017 Shapiro et al.
2017/0235294 A1 8/2017 Shapiro et al.
2017/0243374 A1 8/2017 Matsuzawa
2017/0304897 A1 10/2017 Warland et al.
2017/0341183 A1 11/2017 Buller et al.
2018/0113434 A1 4/2018 Shapiro et al.
2018/0147657 A1 5/2018 Shapiro
2018/0147658 A1 5/2018 Shapiro
2018/0147659 A1 5/2018 Shapiro
2018/0150047 A1 5/2018 Shapiro
2018/0150055 A1 5/2018 Shapiro
2018/0150058 A1 5/2018 Shapiro
2018/0150062 A1 5/2018 Shapiro
2019/0014307 A1 1/2019 McNamer et al.
2019/0058870 A1 2/2019 Rowell et al.
2019/0278250 A1 9/2019 Clement et al.
2019/0310604 A1 10/2019 Shapiro et al.
2020/0039002 A1 2/2020 Sercel et al.
2020/0064806 A1 2/2020 Shapiro et al.
2020/0073362 A1 3/2020 Shapiro et al.

(56) References Cited

U.S. PATENT DOCUMENTS

| | | | | |
|---|---|---|---|---|
| 2020/0089184 | A1 | 3/2020 | Shapiro et al. | |
| 2020/0089185 | A1 | 3/2020 | Shapiro et al. | |
| 2020/0125071 | A1 | 4/2020 | Shapiro et al. | |
| 2020/0192332 | A1 | 6/2020 | Jacobs et al. | |
| 2021/0094127 | A1 | 4/2021 | Sercel et al. | |
| 2022/0262593 | A1* | 8/2022 | Fischione ............... | H01J 37/20 |

FOREIGN PATENT DOCUMENTS

| | | | |
|---|---|---|---|
| CN | 101283362 | A | 10/2008 |
| CN | 201253852 | Y | 6/2009 |
| CN | 101559513 | A | 10/2009 |
| CN | 101733558 | A | 6/2010 |
| CN | 101837517 | A | 9/2010 |
| CN | 104249217 | A | 12/2014 |
| CN | 205958834 | U | 2/2017 |
| CN | 106670656 | A | 5/2017 |
| DE | 102014214058 | A1 | 1/2016 |
| EP | 0050425 | A2 | 4/1982 |
| EP | 0954125 | A2 | 11/1999 |
| EP | 1309108 | A1 | 5/2003 |
| EP | 1645925 | A1 | 4/2006 |
| EP | 2471625 | A2 | 7/2012 |
| EP | 2808123 | A1 | 12/2014 |
| FR | 2748562 | A1 | 11/1997 |
| JP | H03254380 | A | 11/1991 |
| JP | 04244347 | A | 9/1992 |
| JP | H05205051 | A | 8/1993 |
| JP | H06196557 | A | 7/1994 |
| JP | H1128588 | A | 2/1999 |
| JP | 2001330413 | A | 11/2001 |
| JP | 2002123306 | A | 4/2002 |
| JP | 2006187782 | A | 7/2006 |
| JP | 2006329751 | A | 12/2006 |
| JP | 2008119718 | A | 5/2008 |
| JP | 4311856 | B2 | 8/2009 |
| JP | 2011066041 | A | 3/2011 |
| WO | 199403302 | A1 | 2/1994 |
| WO | 199623240 | A1 | 8/1996 |
| WO | 2001076250 | A1 | 10/2001 |
| WO | 2016131019 | A1 | 8/2016 |
| WO | 2016131022 | A1 | 8/2016 |

OTHER PUBLICATIONS

Gao, Rong et al . "Human-Machine Collaborative Workshop Digital Manufacturing." /C/CTA. 2010 IEEE, May 11, 2010 . pp. 445-448.

International Searching Authority, International Search Report and Written Opinion issued in International Application No. PCT/US2017/063190, dated May 3, 2018. 18 pages.

Barbosa, W. et. al. "Samba Reception Desk: Compromising Aesthetics, Fabrication and Structural Performance in the Design Process,", Digital Aids to Design Creativity, vol. 2, eCAADe 30, Jan. 1, 2012, pp. 245-254. XP055844557, [retrieved on Sep. 24, 2021] Retrieved from the Internet: URL:<http://papers.cumincad.org/data/works/att/ecaade2012_163.content.pdf>.

European Patent Office, European Office Action mailed on Jul. 1, 2020, issued in connection with European Application No. 16709185.9, 5 pages.

European Patent Office, European Extended Search Report mailed on Oct. 7, 2021, issued in connection with European Application No. 21180624.5, 13 pages.

European Patent Office, European Extended Search Report mailed on Oct. 8, 2021, issued in connection with European Application No. 21182408.1, 14 pages.

Chinese Patent Office, First Office Action and Translation mailed on Apr. 10, 2019, issued in connection with Chinese Application No. 201680021337.8, 14 pages.

Chinese Patent Office, First Office Action and Translation mailed on Sep. 9, 2021, issued in connection with Chinese Application No. 201780084613.X, 43 pages.

Hartmann, M. et al. "CutCAD User Guide", Feb. 27, 2014, 71 pages. XP055844537, [retrieved on Sep. 24, 2021]. Retrieved from the Internet: URL:<https://hci.rwth-aachen.de/index.php?option=comattachments&taskdownload&id=2059>.

Hattuniemi, J.M. et al. (2009). "A calibration method of triangulation sensors for thickness measurement." 2009 IEEE Instrumentation and Measurement Technology Conference, (12MTC) May 5-7, 2009 Singapore, Singapore, IEEE, Picataway, NJ, USA, 566-569. XP031492700, ISBN: 978-1-4244-3352-0.

Inmagine Group. Vectr Free Online Vector Graphics Software. Mar. 22, 2021, Retrieved from the Internet: URL: <https://vectr.com/. 3 pages>.

International Searching Authority, International Search Report and Written Opinion issued in International Application No. PCT/US2016/017900, dated May 27, 2016. 16 pages.

International Searching Authority, International Search Report and Written Opinion issued in International Application No. PCT/US2016/017901, dated Jun. 3, 2016. 13 pages.

International Searching Authority, International Search Report and Written Opinion issued in International Application No. PCT/US2016/017903, dated Jun. 1, 2016. 15 pages.

International Searching Authority, International Search Report and Written Opinion issued in International Application No. PCT/US2016/017904, dated May 23, 2016. 19 pages.

International Searching Authority, International Search Report and Written Opinion issued in International Application No. PCT/US2017/063187, dated Apr. 3, 2018 . 11 pages.

International Searching Authority, International Search Report and Written Opinion issued in International Application No. PCT/US2017/063188, mailed Feb. 16, 2018. 14 pages.

International Searching Authority, International Search Report and Written Opinion issued in International Application No. PCT/US2017/063189, dated May 2, 2018. 22 pages.

International Searching Authority, International Search Report and Written Opinion issued in International Application No. PCT/US2017/063191, dated Mar. 21, 2018. 12 pages.

International Searching Authority, International Search Report and Written Opinion issued in International Application No. PCT/US2017 /063192, dated Apr. 19, 2018. 12 pages.

International Searching Authority, International Search Report and Written Opinion issued in International Application No. PCT/US2017/063193, dated Feb. 16, 2018. 12 pages.

European Patent Office, European Office Action mailed on Oct. 27, 2021, issued in connection with European Application No. 16709185.9, 5 pages.

Robertson, D. et al. (Sep. 1991), "CAD and Cognitive Complexity: Beyond the Drafting Board Metaphor," Manufacturing Review, American Society of Mechanical Engineers, New York, US, vol. 4, No. 3, pp. 194-204, XP000233200,ISSN: 0896-1611.

Sass, L. (2007), "Synthesis of design production with integrated digital fabrication", Automation In Construction, Elsevier, Amsterdam, NL, vol. 16, No. 3, Feb. 7, 2007, pp. 298-310, XP005877992,ISSN: 0926-5805, DOI: 10.1016/J.AUTCON.2006.06.002.

Chinese Patent Office, Second Office Action and Translation mailed on Nov. 4, 2019, issued in connection with Chinese Application No. 201680021337.8, 7 pages.

Sliwinski, P. et al. (2013). "A Simple Model for On-Sensor Phase-Detection Autofocusing Algorithm." Journal of Computer and Communications, vol. 1, No. 6, pp. 11-17. doi:10.4236/jcc.2013.16003, ISSN: 2327-5219.

Chinese Patent Office, Third Office Action and Translation mailed on Jul. 23, 2020, issued in connection with Chinese Application No. 201680021337.8, 31 pages.

Chinese Patent Office, Third Office Action and Translation mailed on Jan. 20, 2023, issued in connection with Chinese Application No. 201680021300.5, 7 pages.

European Office Action issued in corresponding European Patent Application No. 21182408.1 dated Jan. 14, 2026, pp. 1-11.

European Office Action issued in corresponding European Patent Application No. 21180624.5 dated Jan. 15, 2026, pp. 1-9.

Chinese Office Action issued in corresponding Chinese Patent Application No. 202311146215.X dated Jan. 29, 2026, pp. 1-12.

(56) References Cited

OTHER PUBLICATIONS

European Office Action issued in corresponding European Patent Application No. 21182408.1 dated Aug. 26, 2026, pp. 1-13.

* cited by examiner

310

```
<svg width = "640" height = "480" xmlns=http://www.s3.org/2000/svg>
    <g>
        <rect x="100" y="100" fill="#000000" width="300" height="150" fill-opacity="0" stroke="000000"/>
    </g>
</svg>
```

Fig. 3A

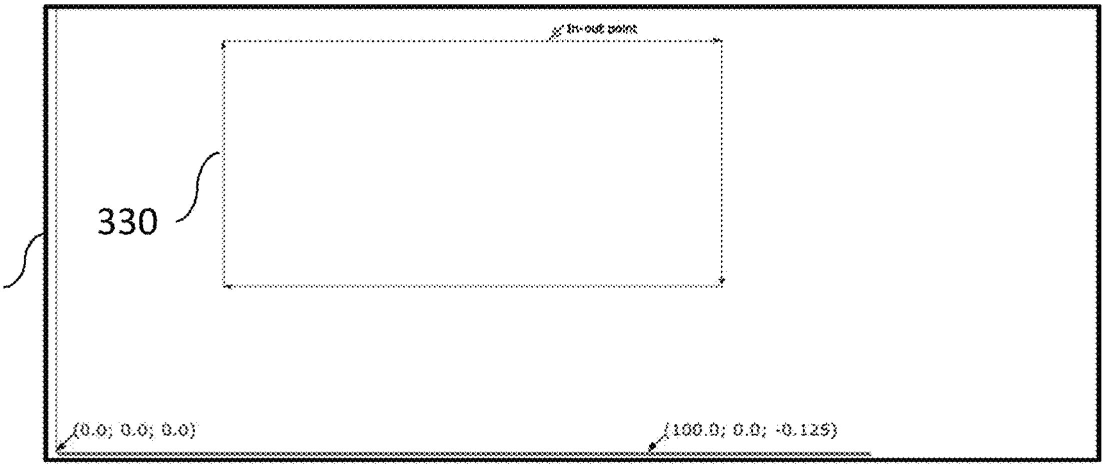

320

Fig. 3B

340

```
%
(Header)
M3
(Header end.)
G21

(Start cutting path id: rect3336)
(Change tool to Default tool)

G00 Z5.000000
G00 X28.362631 Y70.415140

G01 Z-0.125000 F100.0(Penetrate)
G01 X112.748481 Y70.415140 Z-0.125000 F400.000000
G01 X112.748481 Y28.362624 Z-0.125000
G01 X28.362631 Y28.362624 Z-0.125000
G01 X28.362631 Y70.415140 Z-0.125000
G00 Z5.000000

(End cutting path id: rect3336)


(Footer)
M5
G00 X0.0000 Y0.0000
M2
(Using default footer. To add your own footer create file "footer" in the output dir.)
(end)
%
```

Fig. 3C

VISUAL PREVIEW FOR LASER FABRICATION

CROSS-REFERENCE TO RELATED APPLICATIONS

This application claims the benefit of priority as a continuation under 35 U.S.C. § 120 to U.S. application Ser. No. 16/691,429, filed Nov. 21, 2019, which is a continuation of U.S. application Ser. No. 15/334,095, filed on Oct. 25, 2016 and now issued as U.S. Pat. No. 10,520,915, which is a continuation of international application No. PCT/US2016/017900, filed on Feb. 12, 2016, which claims the benefit of priority to the following provisional applications: U.S. Provisional Application No. 62/115,562 filed Feb. 12, 2015; U.S. Provisional Application No. 62/115,571 filed Feb. 12, 2015; U.S. Provisional Application No. 62/222,756 filed Sep. 23, 2015; U.S. Provisional Application No. 62/222,757 filed Sep. 23, 2015; and U.S. Provisional Application No. 62/222,758 filed Sep. 23, 2015. The disclosures of each of the aforementioned applications are hereby incorporated herein by reference in their entirety.

TECHNICAL FIELD

The subject matter described herein relates to manufacturing processes implementing, or aided by, machine vision incorporating a wide-angle viewing system inside the manufacturing machine.

BACKGROUND

Computer controlled manufacturing systems, such as "3-D printers," laser cutter/engravers, CNC milling machines, and the like, can be used to create complicated items where traditional manufacturing techniques like moldings or manual assembly fail. Such automated methods operate based on instructions that specify the cuts, layers, patterns, and other actions to be performed. The instructions can be in the form of computer files transferred to the memory of a computer controller for the machine and interpreted at run-time to provide a series of steps in the manufacturing process.

SUMMARY

In one aspect, a computer numerically controlled machine includes a movable head configured to deliver electromagnetic energy to a part of a working area defined by limits within which the movable head is commanded to cause delivery of the electromagnetic energy. The working area is inside an interior space of the laser computer numerically controlled machine. The interior space is defined by a housing includes an openable barrier that attenuates transmission of light between the interior space and an exterior of the computer numerically controlled machine when the openable barrier is in a closed position. The computer numerically controlled machine includes an interlock that prevents emission of the electromagnetic energy when detecting that the openable barrier is not in the closed position. The commanding results in the computer numerically controlled machine executing operations of a motion plan for causing movement of the movable head to deliver the electromagnetic energy to effect a change in a material at least partially contained within the interior space.

An image is generated including at least half of the working area with at least one camera. The generating occurs when the interlock is not preventing the emission of the electromagnetic energy.

In another aspect, a computer numerically controlled machine includes a movable head configured to deliver electromagnetic energy to a part of a working area defined by limits within which the movable head is commanded to cause delivery of the electromagnetic energy. The working area is inside an interior space of the laser computer numerically controlled machine. The interior space is defined by a housing includes an openable barrier that attenuates transmission of light between the interior space and an exterior of the computer numerically controlled machine when the openable barrier is in a closed position. The commanding results in the computer numerically controlled machine executing operations of a motion plan for causing movement of the movable head to deliver the electromagnetic energy to effect a change in a material at least partially contained within the interior space.

Emission of the electromagnetic energy is temporarily prevented. Also, an image including at least half of the working area with at least one camera is be generated. The generating occurs when the openable barrier is in the closed position and during the temporality preventing of the emission of the electromagnetic energy.

In some variations one or more of the following features can optionally be included in any feasible combination.

The change in the material can include at least one of cutting, etching, bleaching, curing, and burning. The image can be processed to remove distortion. The distortion can include chromatic aberration. The image can be enhanced by increasing contrast. Pixels in the image can be mapped to corresponding physical locations within the working area.

The one camera is not mounted to the movable head or the camera is attached to the openable barrier. The camera can be a single camera that is not mounted to the movable head. The single camera can be mounted within the interior space and opposite the working area or attached to the openable barrier.

An image with the single camera can be taken when the openable barrier is not in the closed position, the additional image can include an object exterior to the interior space. The object exterior to the interior space can be a user of the computer numerically controlled machine.

The camera can be capable of motion. The motion can include a translation to positions, rotation, and tilting along one or more axes. The camera can be mounted to a translatable support. The translatable support can include the moveable head.

The generating of the image can include capturing sub-images by the camera, and the generating can include assembling the sub-images to generate the image. Second sub-images can be captured after motion of the at least camera relative first sub-images. The assembling can include stitching the plurality of sub-images to create the image.

The image can be processed to generate data related to one or more of a position, a higher order derivative of location, a velocity, an acceleration, an anomalous condition, and a non-anomalous condition of a movable component of the computer numerically controlled machine captured in the image. An action can initiate or terminate another action based on the generated data.

The movable component can be disposed in a fixed spatial relationship to the movable head, where the method further can include using the data to update software controlling operation of the computer numerically controlled machine with the movable head position and a higher order derivative thereof. The movable component can include an identifiable mark on the movable head. The movable component can include the movable head and/or a gantry.

The image can be processed using one or more mathematical operations on the image and additional images of the working area. The mathematical operation can result in an improved image for analyzing imaged objects in the image relative to the image alone.

Additional images of the working area can be captured in conjunction with causing a change in operation of a component of the computer numerically controlled machine. The change in operation can include changing a light output of lights between taking the image and the additional images. The position of the component can be changed between taking the image and additional images, and vibrating the camera while taking the image and/or the additional images. The improved image can include sharpening, correction of lighting artifacts, averaging, edge detection, and noise elimination relative to the image. The images can be generated with differing lighting conditions created by light sources inside the interior space. The light sources can include light resulting from operation of laser.

A camera can be triggered based on a signal from a sensor integrated into the computer numerically controlled machine where, sensor is not a user-operable camera control.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A is a diagram illustrating one example of an SVG source file, consistent with some implementations of the current subject matter;

FIG. 3B is an example of a graphical representation of the cut path in the CNC machine, consistent with some implementations of the current subject matter;

FIG. 3C is a diagram illustrating the machine file corresponding to the cut path and the source file, consistent with some implementations of the current subject matter;

When practical, similar reference numbers denote similar structures, features, or elements.

DETAILED DESCRIPTION

Figure 1:
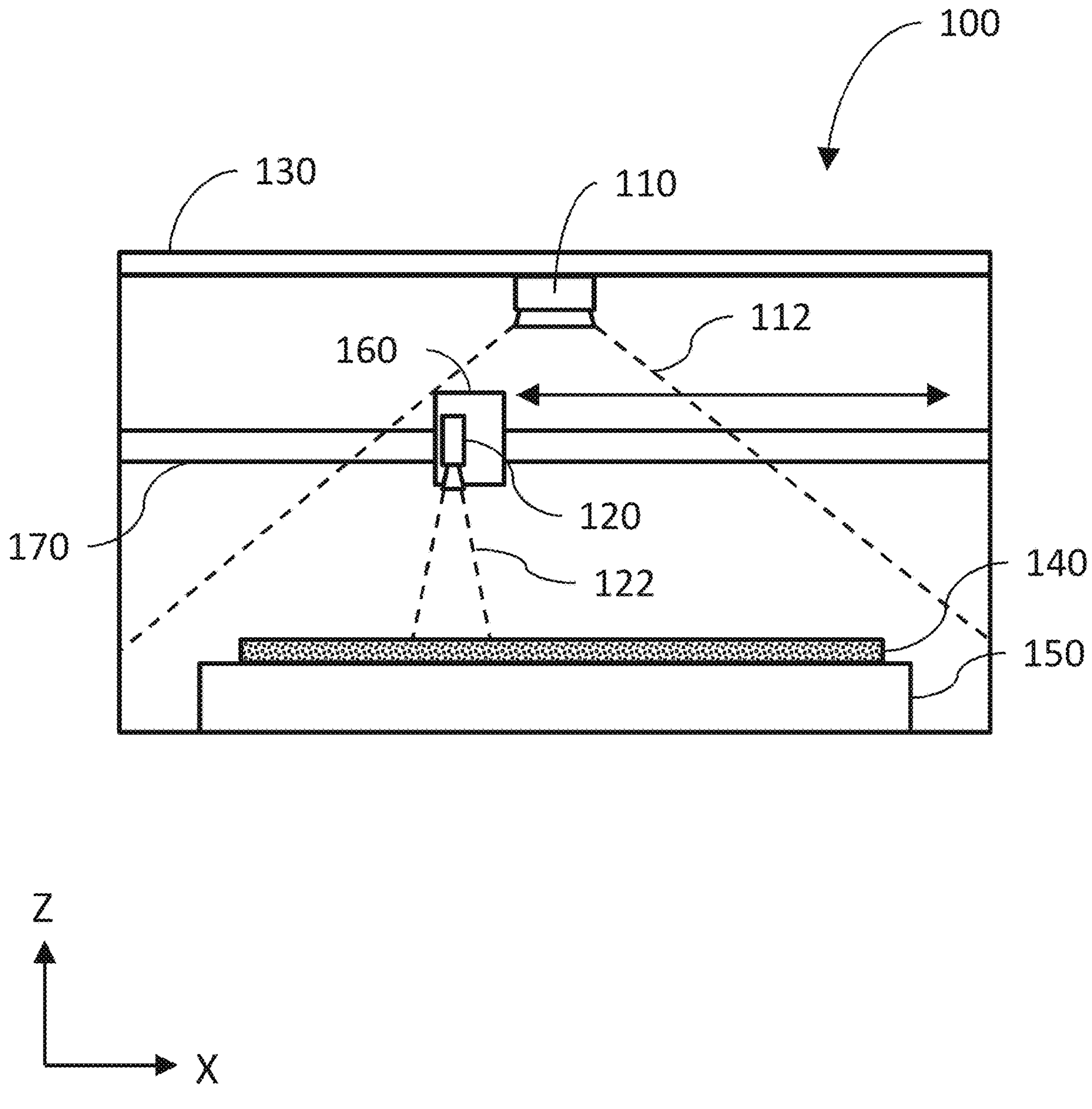
FIG. 1 is an elevational view of a CNC machine with a camera positioned to capture an image of the entire material bed and another camera positioned to capture an image of a portion of the material bed, consistent with some implementations of the current subject matter.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

Figure 2:
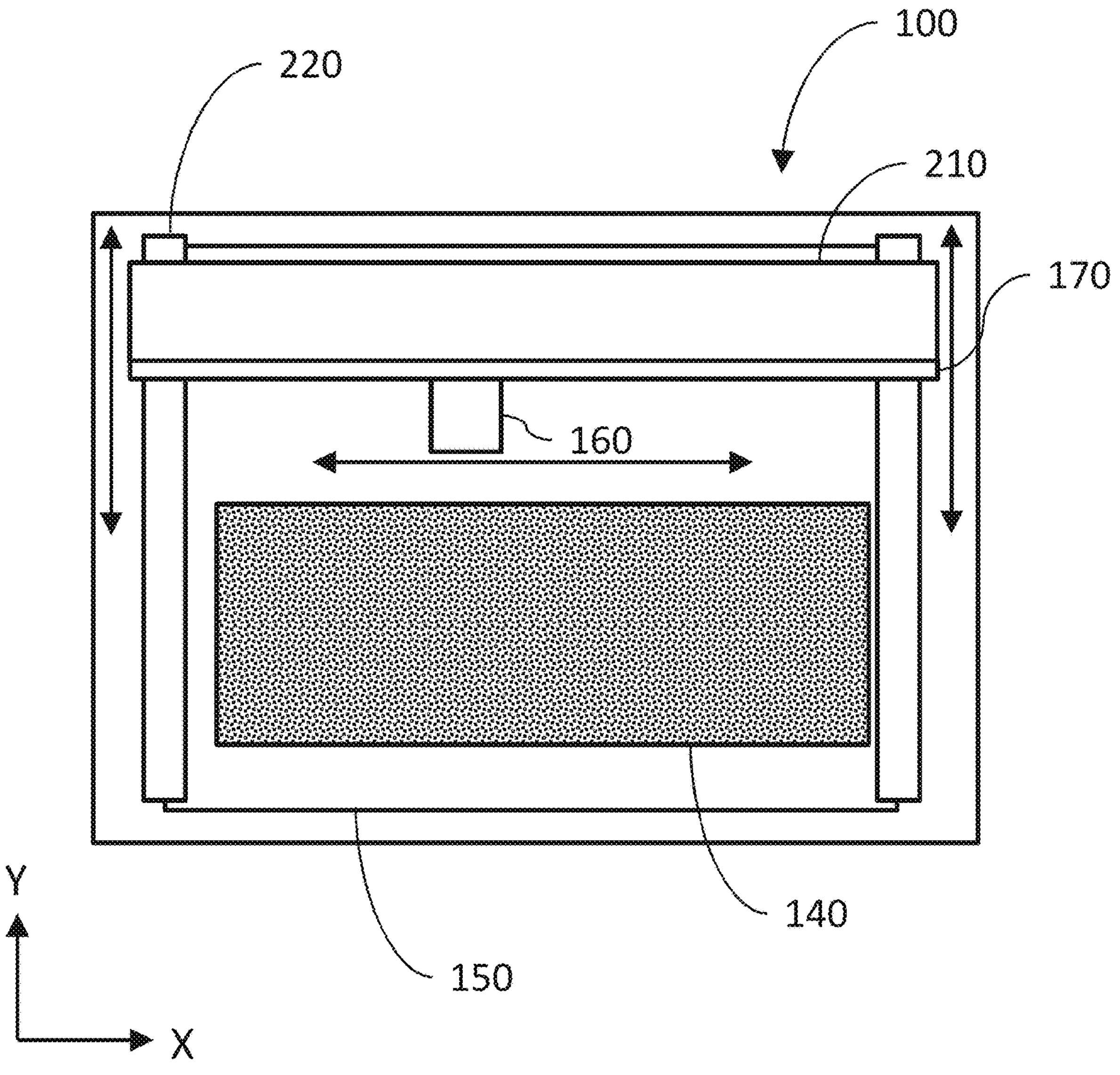
FIG. 2 is a top view of the implementation of the CNC machine shown in FIG. 1.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 $in^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1). STL files that define a three-dimensional object that can be fabricated with a 3D printer or carved with a milling machine, 2). SVG files that define a set of vector shapes that can be used to cut or draw on material, 3). JPG files that define a bitmap that can be engraved on a surface, and 4) CAD files or other drawing files that can be interpreted to describe the object or operations similarly to any of the examples above.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
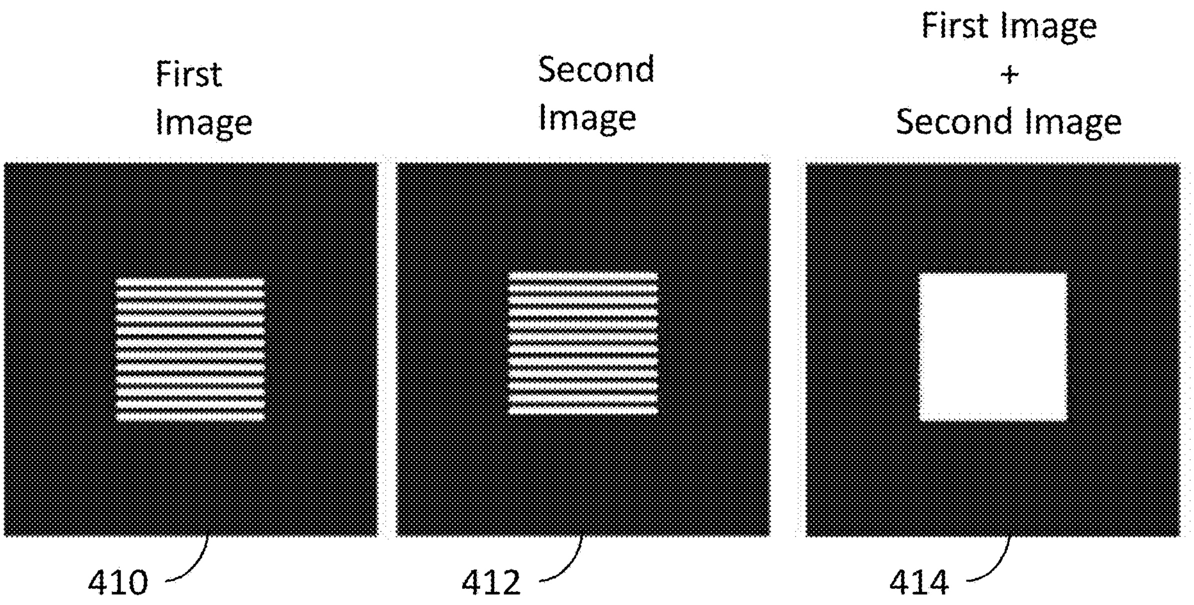
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
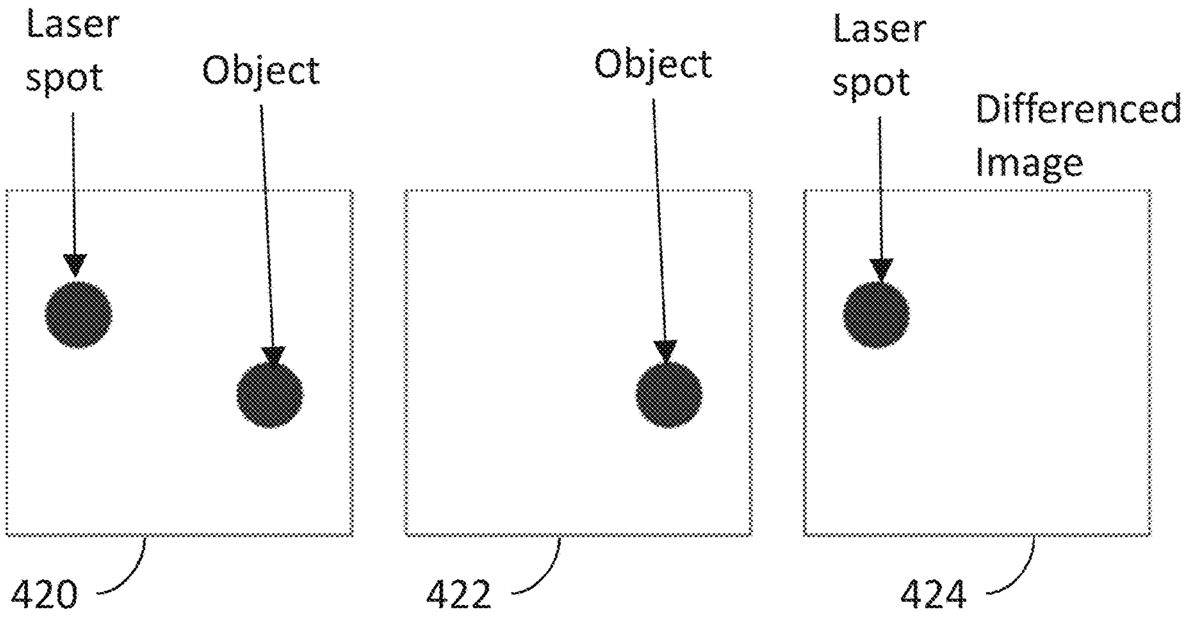
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
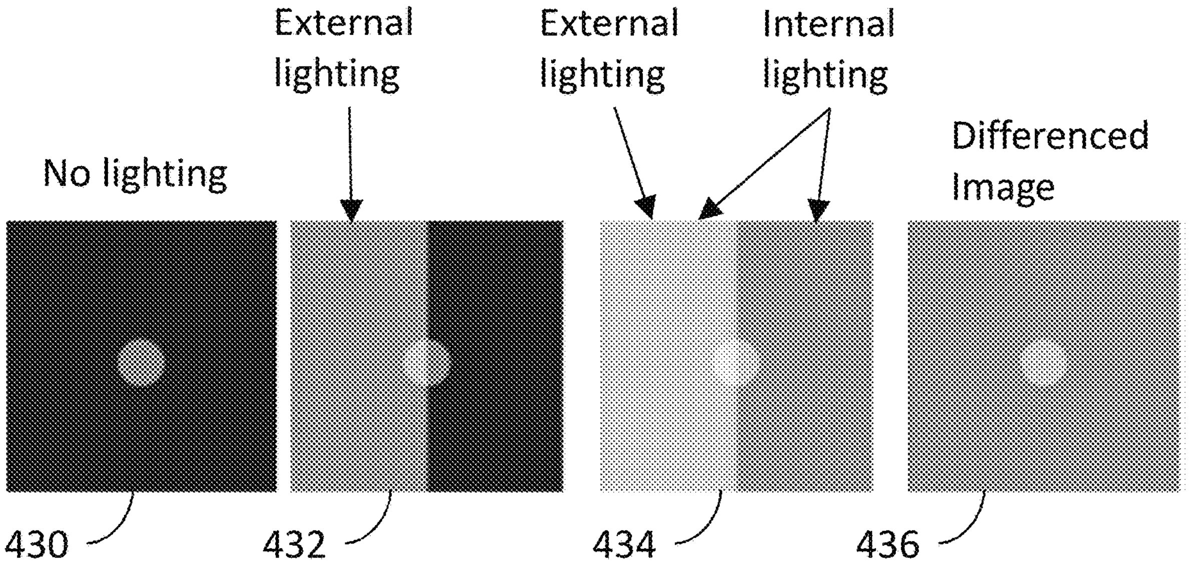
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $1/60^{th}$ of a second, or less than $1/120^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Recalling Head to Home Position Prior to Image Acquisition

Particularly in the case of cameras with a wide-field of view, there can be obstructions in the images acquired with these cameras. For example, referring to FIG. 1, the lid camera 110 field of view encompasses the head 160. Thus, the head 160 is blocking some portion of the material 140 from being imaged. If it is determined that the head 160, or any other component, is blocking the camera from viewing a desired area, an instruction can be sent to the CNC machine 100 to move the obstructing element to a location in the interior portion such that it does not obstruct the camera imaging the material 140. For example, the head 160 can be moved to a home position towards the rear, or one of the sides, or the front, of the machine. Once the head 160 is not obstructing the view of the material 140, or has arrived at the predefined location, the camera can acquire additional images. Subsequently, an instruction can be generated for the head 160 to move to another location, or to resume execution of the motion plan. In another example, it may be impossible to capture the entire interior without obstruction, so the head or other obstruction can be instructed to move to multiple different locations and a picture taken at each point. The pictures can then be subsequently combined to form an accurate view of the entire bed. In another example, the camera can be instructed to image elements of the CNC machine 100, for example the head 160. Consequently, the CNC machine 100 can receive instructions to move the head, or other portion of the CNC machine 100, into the view of the camera.

Trigger Image Acquisition Based on Sensor Data

As described above, in addition to the cameras in the CNC machine 100, there can be other sensors integrated into or otherwise associated with the CNC machine 100. Such sensors can include any of accelerometers (e.g., sensors for determining a position and higher order derivatives thereof such as velocity, acceleration, etc.), microphones, thermal sensors, optical sensors, etc. The sensors can provide sensor data that can be interpreted by a sensor data analysis program. The interpretation of the sensor data can correspond to a condition in the CNC machine 100, for example, a vibration, a temperature, a sound, presence of electromagnetic radiation, etc. In some implementations, images can be acquired in response to sensor data (e.g. signals from one or more sensors) and the subsequent interpretation of the sensor data. In some examples, a sensor providing such a signal is not a user-actuable camera control (e.g. not a hardware or graphical user interface button or other control by which a user can manually trigger a camera to capture an image). In one example, an event, closing (e.g. the openable barrier) of the CNC machine 100 can trigger one or more sensors that indicate that the CNC machine 100 contents may have changed and an image should be captured, obviating the need for the user to manually trigger an image capture event to inspect the new contents. In another example, the sensor can detect that the lid 130 is open. This event can trigger the capture of an image of the user loading or unloading material. In another example, if an anomalous sound is detected by a microphone, a camera can be sent a command to acquire an image of part of the CNC machine 100. The image can then be analyzed by an image analysis program or by a user to determine the cause of the anomalous sound or other sensor input and/or to identify other occurrences, factors, etc. that correlate with the anomalous sound or other sensor input. In another example, if an accelerometer in the head detects an anomalous reading, the camera can image the head and inspect it for a collision; however, if the same anomaly is detected in an accelerometer in the body, then the system can determine that the entire unit was impacted from the outside and instead inspect the material to see if the impact shifted its position. In general, an event that triggers capturing of an image by a camera of a CNC machine 100 can include any of moving the openable barrier from the closed position, a moving of the openable barrier to the closed position, a motion of the laser computer numerically controlled machine (e.g. of the housing), a fire inside the interior space, an anomalous condition of a component of the laser computer numerically controlled machine, a temperature inside the interior space exceeding a threshold, electromagnetic radiation present in an unexpected place or at an unexpected time, etc.

3-D Scanning

Figure 5:
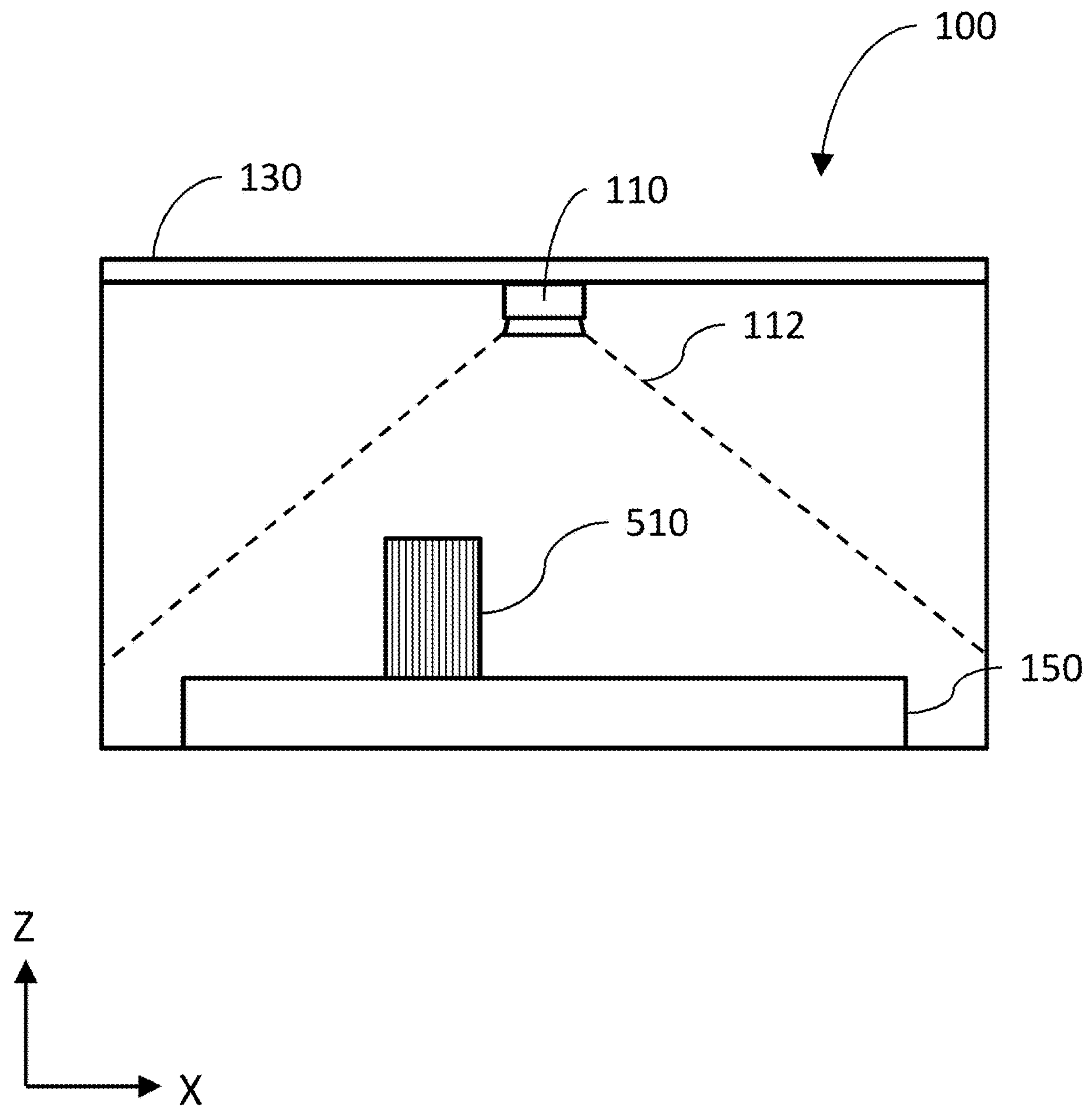
FIG. 5 is a diagram illustrating the lid camera imaging a three-dimensional object in the CNC machine, consistent with some implementations of the current subject matter.
Figure 6:
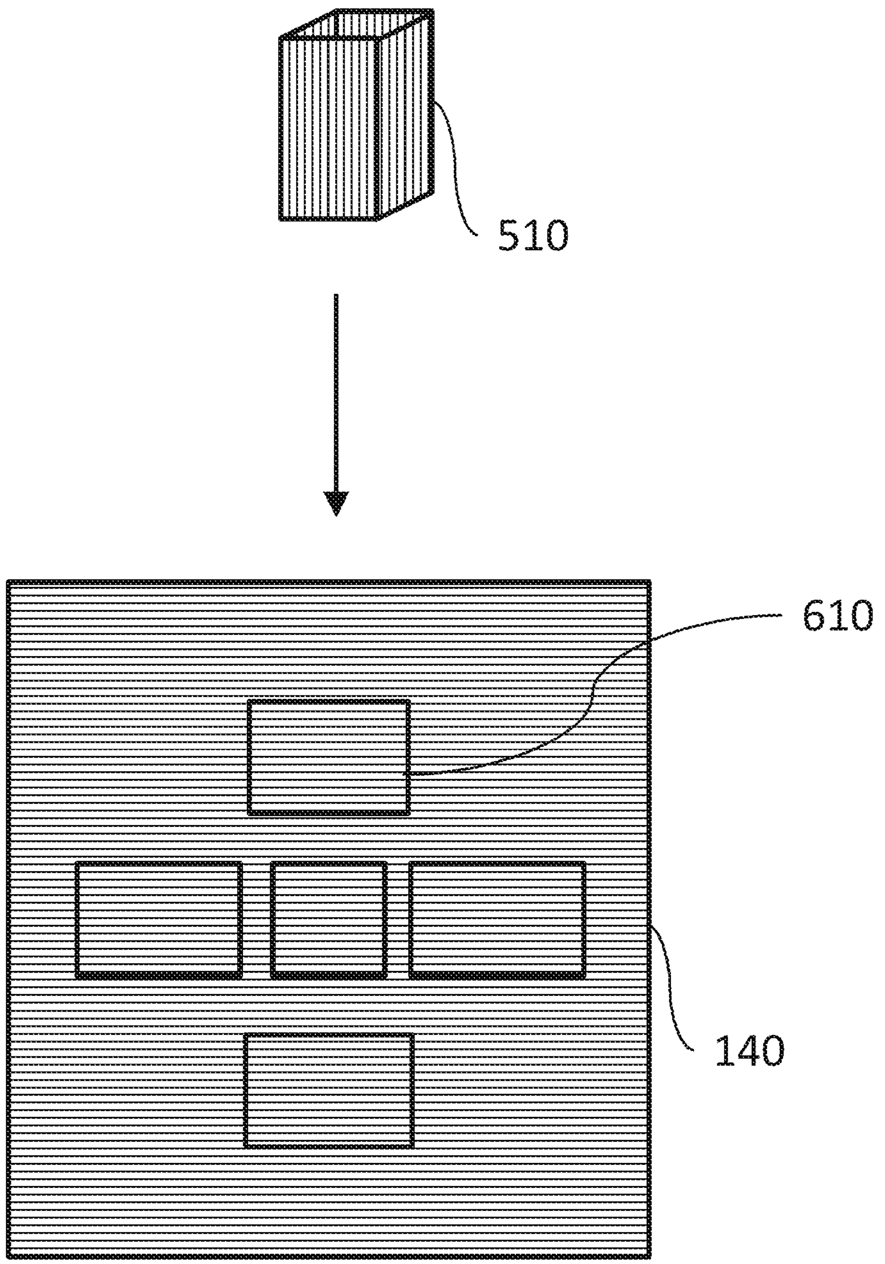
FIG. 6 is a diagram illustrating expressing the object imaged in FIG. 5 as a collection of 2-D patterns overlaid on the material in the CNC machine, consistent with some implementations of the current subject matter.

FIG. 5 is a diagram illustrating the lid camera 110 imaging a three-dimensional object 510 in the CNC machine 100, consistent with some implementations of the current subject matter. FIG. 6 is a diagram illustrating expressing the object 510 imaged in FIG. 3 as a collection of 2-D patterns 610 overlaid on the material 140 in the CNC machine 100, consistent with some implementations of the current subject matter. Any of the optical features described herein can be utilized by the CNC machine 100 to perform a 3-D scan of the material 140. Such a scan, which can be implemented according to its own motion plan, can be utilized irrespective of the creation of the motion plan for fabrication. Once complete, the 3-D scan can be transmitted to a cloud server or other computing system in order to provide a user with a computer rendering of the material 140. The 3-D scan of the material 140 can also be used in conjunction with creating a preview of what the material 140 will look like after it has been engraved and/or cut. The 3-D scan can also provide an estimate of the amount of scrap material 140 that will be left over after the cut. The 3-D scan can also be taken at multiple times during the cutting process in order to provide a digital evolution of the material 140 as the motion plan is executed. The 3-D scan can even be used for separate purposes, like sharing the results of a cutting operation on a social network. It can also be used to scan the object 510 (e.g. a metal figurine) for replication on another material 140. In particular, images taken by any of the cameras in the CNC machine 100 can be integrated to perform a 3-D rendering. This can be done in conjunction with user input, for example, specifying that an image (from a particular camera) is a 'top', 'side', etc. Also, the use of distance-finding techniques can be used to determine the position of a surface of the material 140. For example, one or more lasers can be used to determine the extents of the material 140.

Material Outline

The cameras can also be used to determine the size and outline of material 140 in the CNC machine 100. This allows the user to place material 140 at arbitrary locations within the CNC machine 100 and to use material 140 with unusual shapes, for example scrap material 140 with holes already cut in it.

Images from the cameras can be compared against images of the device without any material 140. Differencing these images can provide an indication of the material 140, such as an outline or a 3-D shape. In another implementation, the bottom of the CNC machine 100 and/or the material bed 150 can be designed to appear in a particular manner to facilitate digital removal from an image. For example, the bottom of the CNC machine 100 could be green and the green in the image can be digitally removed to identify the material 140. Alternately, a "flash" could be used by onboard LEDs to illuminate with a color that would not reflect from the material 140. In another example, the material 140 can be recognized by its appearance or by the presence of distinguishing markings, such as UV barcodes repeated across its surface, to identify the material 140. In another example the edges of the material 140 can be detected as continuous closed shapes, even though the center of the material 140 might be invisible (in the case of clear acrylic).

Once the material outline has been captured, the material 140 outline can be displayed to the user. The material outline can be used as an input to automated layout algorithms that attempt to place all parts within the material 140 confines. The material 140 outline can be used as a set of constraints in a virtual simulation that would allow the user to drag around parts that would collide with the edges of the material 140, so the user could experiment with positioning of parts without dragging them off the material 140.

Material Preview

Figure 7:
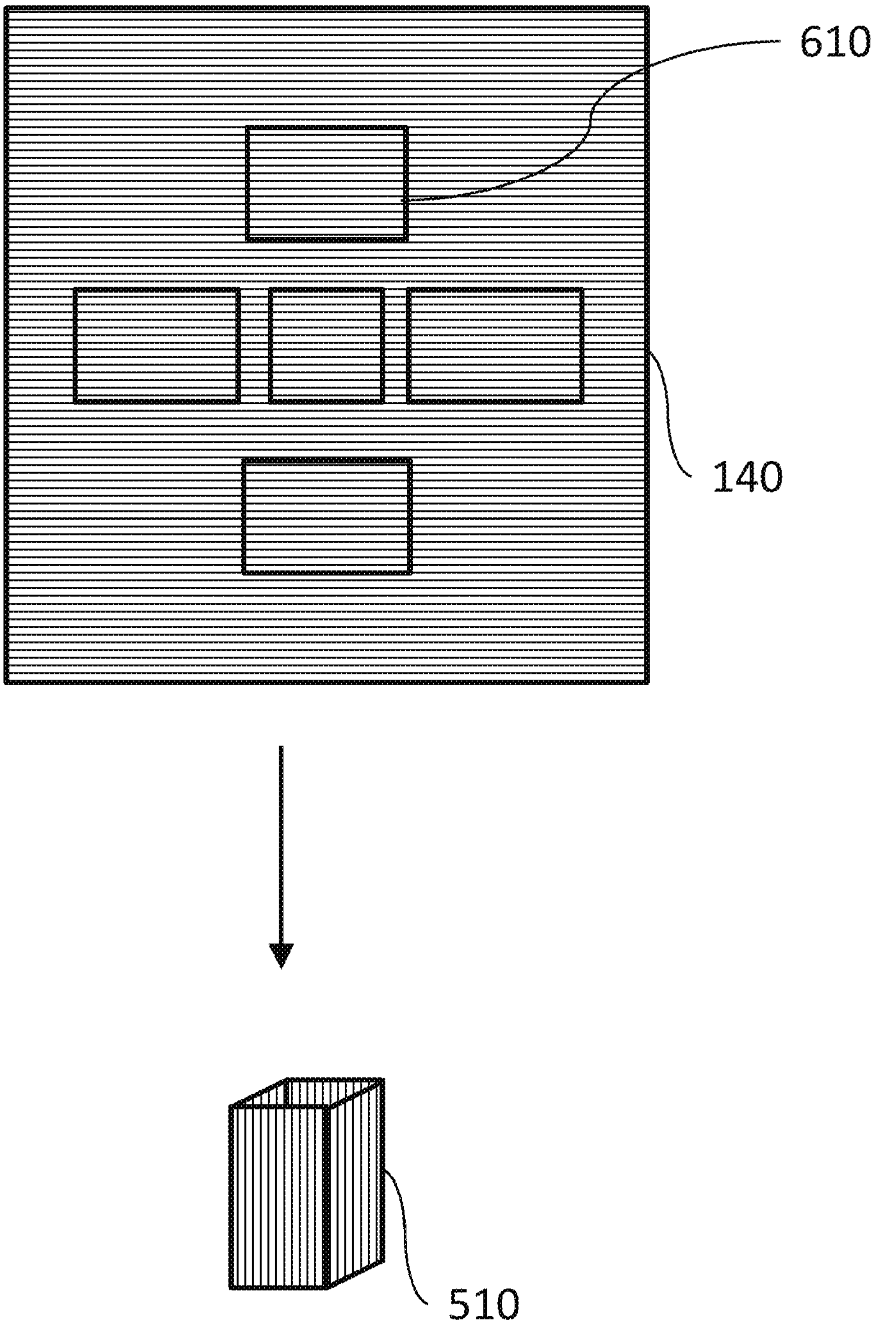
FIG. 7 is a diagram illustrating a collection of 2-D patterns previewed as a three dimensional object, consistent with some implementations of the current subject matter.

FIG. 7 is a diagram illustrating a collection of 2-D patterns 610 previewed as a three dimensional object 510, consistent with some implementations of the current subject matter. The cameras can capture the appearance of the material 140 in the CNC machine 100 before machining. For example, the system can display to the user what the final product will look like, rendered as a 3-D object 510. The images of the material 140 can serve as a texture map, which can then also be rendered onto the 3-D object 510. This means the user can accurately see what the final product will look like with the material 140 currently in the CNC machine 100. Further, if there are defects in the material 140, the user can see where they will appear on the 3-D object 510. If, in software, the user repositions the location of the cuts on the material 140, the result of the material 140 preview can change to reflect the repositioned cut locations. Among other possible benefits, this feature can allow the user to optimize the patterns to have poorer quality areas of the material 140 hidden from view, such as on an interior surface of the assembled product, or outside of the patterns entirely. It also allows the user to preview their creation using different materials, to help in material selection.

The user can also indicate the position of the cuts across multiple materials 140 present on the material bed 150. For example, the user can place a piece of maple and a piece of walnut plywood on the support, then use the image of the material 140 on a screen to arrange the location of the cuts such that some pieces are made out of maple and some are made out of plywood. In another manner, a user can select some shapes in the pattern to be cut from each type of material 140 depending on the appearance or physical properties desired.

Different power levels for the output of the head 160 and head speeds can result in different appearances of the material 140 during processing. For example, the head 160 moving at different speeds can cause a burn pattern left behind by a laser to vary, the roughness of a cut made by a milling bit to vary, etc. The user can preview what the material 140 will look like after processing by using images captured from, for example, a previous calibration step. The appearance of a type of wood marked with 20% of maximum power during calibration, for example, can be used to predict what an engraving at 20% power will look like. The predicted appearance can be shown on a graphical display to the user to aid in project design or in the selection of settings to use.

The cameras can also capture the appearance of the material 140 after being cut, engraved, turned, printed upon, etc. These captured images, accessed either from an image library or acquired from test cuts on the actual material 140, can provide an accurate image of the response of the material 140 to machining using particular output parameters. For example, test cuts at a given power, head 160 speed, bit rotation, or the like, can be performed in a scrap area of the material 140 to provide examples of how the material 140 will appear if cut with those same settings. Similarly, the image of the material 140 after being cut may be used to assess the material's new position following some interaction with the user. For example, a large design whose size is roughly twice that of the material bed 150 can be completed in the form of two sequential cuts with a pause between them in which [a] the user or some material translating mechanism of or associated with the CNC machine repositions the material to expose further uncut space and [b] the camera determines from what point the cut was left off.

If the material 140 is recognized from a library, image analysis, or a previous usage, pre-calculated or stored settings can be used to provide a desired result. The identification of the material 140 from a library can be accomplished in several ways.

First, barcodes or other markings can be used to identify the type of material 140. These can be visible or can be invisible to the naked eye and revealed only with an infrared camera and illumination, or under ultraviolet light provided by appropriate lights e.g. UV LEDs. They can also be printed in standard visible ink. Text can be printed on the material and recognized with optical character recognition software. The camera may also detect incidental markings, such as the brand of material 140 on a protective sheet.

Second, the cameras can use image recognition to identify the material 140. For example, the grain structures of maple, cherry, and walnut are all distinctive. Distinctive colors and patterns in the material 140 can be imaged and compared to known material 140 examples stored in a local memory of the CNC machine 100 or stored on a remote computer.

Using Marks and Drawings to Indicate Cuts

Scanning by the cameras can also be used for copying the pattern of an existing 2D object. In one example, the user can make a marking on a piece of material 140 using a black pen. They can then place the material 140 in the unit. The camera can scan the image and isolate the region with the black pen, using the image to create a source file. The system can then generate a machine file and a motion plan, instructing the machine to move into position, move the head across the indicated region along a calculated path, activate the engraving function, deactivate the function, and finish. The result would be that the material 140 is engraved in the same location and with the same marking that was applied with ink. Different colors of ink can be used to indicate different operations, for example a red line might be used to indicate cutting while a brown line indicated a light engraving. Functions can be specified in software between the scanning step and the creation of the machine file, for example the user might be asked if the black marks should be cut or scanned. Other indicators than ink might be used, for example the user can cut a paper snowflake and use the machine vision system to scan its perimeter and generate a source file from the image of the perimeter. In all these examples, the source file can be saved and modified, so the scanned image could be moved, resized, repeated, or preserved for later.

In another implementation, the cameras can detect a pattern on the material 140 that corresponds to a design stored in memory, and then the CNC machine 100 can machine the stored design onto the material 140. Note that this is different from alignment marks, which can be used when the motion planning software is told where the alignment marks are and what the corresponding design is. In this case, the cameras can image the material 140 and the alignment marks and determine what the design is from the images. In another example, the cameras can identify a piece of scrap left over from a previous operation by imaging the cut marks present as a result of the previous operation, or created intentionally on the scrap as alignment marks anticipating that the scrap could be used with further processing.

In one implementation, material 140 can be inserted into the CNC machine 100 that has a certain pattern, for example, a red square circumscribing a filled in black circle. The material (and the pattern) can be imaged by the cameras. A particular operation can be selected based on the image, for example, red lines can be converted into vector cut paths and black areas can be converted into raster engravings. A motion plan can be generated based on the selected operations, for example, cut out the square and engrave the circle. The CNC machine 100 can then execute the motion plan to perform, for example, the cutting and the engraving.

Different color marks can indicate different cutting operations—for example, a red line might indicate cut through, while a black filled in area might indicate to etch. A sheet of paper, or other suitable overlay, containing a pattern or picture can be fastened to a piece of material 140, then that pattern or picture can be engraved directly on the material 140, through the overlay. This form of design can be applied directly to the target material 140 with the overlay presumably destroyed by the machining operation. Alternately, the material can be removed before the operation commences. In either case, the pattern can be saved for later, modified and/or repeated. The type of output from the CNC machine 100 can vary with the color, line thickness, line type, etc. As one example, a blue line could indicate to etch at 40% power, and a green line could indicate to etch at 60% power.

A user can also put a drawing in the CNC machine 100 separately, allow the camera(s) to scan the drawing, and then insert a separate piece of material 140 to be cut or engraved. The first pass of a scanning camera can scan the image while the second pass, with the head 160, can cut the material 140.

The system can use a screen, projector, or other visual feedback unit to generate virtual overlays of programmed cut lines on images or video of the actual material 140. Also, images gathered previously, for example, during a calibration pass where test cuts are made, can allow the preview of the cuts to appear realistically. Also, images gathered previously, for example, during a calibration pass where test cuts are made, can allow the preview of the cuts to appear realistically. For example, the actual material 140 texture and the typical "V" shape of the cut or singing at the cut edges can be displayed when previewing the product. The user can also opt to arrange pieces between multiple materials that may be present or rearrange them to take advantage of material properties, for example aligning pieces with the grain of the wood.

Similarly, the user can insert both the drawing and the material 140 to be cut at the same time but in different locations on the machine bed, and indicate that one is the source and the other is the destination. In this example, the user 'copies' the image from one piece to the next. The user can optionally resize or otherwise modify the drawing in software before machining. For example, the user can specify that the destination is to be magnified, rotated, and/or translated, relative to the source. In the example of a cut into transparent material, such as glass or clear acrylic, the drawing may also be placed visibly on the underside of the material, thus minimizing these interactions.

Detecting Materials and Objects in the CNC Machine

Many CNC machines, particularly mills, rely on having a known material in place before beginning. If the wrong size of raw material is inserted, for example if the material is too tall, the head may collide with it. In another example, there may be unaccounted-for material such as clamps in the workspace. It is common for there to be collisions between the head and such items, resulting in damage.

Multiple cameras, or a moving camera, can be used to determine what the actual configuration of the workspace is. This can be used to detect collisions in a number of ways. For example, the software creating the motion plan can specify in advance what materials it expects to be present and at what locations. This can involve characterizing, from the acquired image data, coordinates corresponding to a surface of the material. These coordinates can be compared to coordinates that represent where the material is supposed to be. The comparison can be based on the motion plan, images, user input, etc. If the present coordinates of the material are not in agreement with the expected coordinates, this can be interpreted as an error state. The CNC machine 100 can then take an action in response to the detection of the error state. For example, processing could halt, an alarm can activate, a user can be determined, or the motion plan can be updated based on the new material coordinates.

The software can model the machine moving around all the materials present. If the machine will intersect the material at a speed that is unsafe, or move the spinning bit through too much material, it is also an error state.

The software creating the motion plan can specify what motions are intended to intersect solid material and which ones are not. The software may run a simulation based on the motion plan plus the observed materials in the workspace to see if intersections occur outside of the planned areas.

Characterized and Calibrated Materials

Images acquired by the cameras, or otherwise supplied to or from the CNC machine 100, can be analyzed to generate or modify instructions for the operation of the CNC machine 100. Images can be used to identify, for example, a material or product placed in the CNC machine 100. The identification of the material 140 in the CNC machine 100 can be associated or based on with known properties of the material or product. For example, the identification can made by the CNC machine 100 based on wood grain, color, texture, etc. In another example, identification may be made based on textual or other visual analysis of markings present on protective coatings of some materials. One example of such a protective coating can be a plastic that has a paper layer stuck to the surface of the plastic. In addition to protecting the plastic from being scratched during transport or handling, the paper layer can include images, text, barcodes, or the like, which provide readable information intended for humans or for machines other than the CNC machine, for example automated inventory management. In another example, identification can be based on markings designed for the purpose; text, images, barcodes, watermarks, or an embedded or attached device like a printed tag or an embedded microchip that are intended for the CNC machine to read.

In some implementations, the material can be identified as a "characterized material." A characterized material is a material that can have significant variations, but the CNC machine is able to adapt the motion plan to handle any observed variations in results during machining. As one example, there can be natural walnut that has significant variation, and the CNC machine can have for settings that handle its 'worst case' behavior and/or iteratively process the material, inspecting after each pass to ensure that the material is sufficiently cut, engraved, etc.

In other implementations, the material can be identified as a being a calibrated material. Calibrated materials, as described herein, can refer to materials that have a well-understood and consistent composition and/or for which the effects of laser cutting or the like are one or more of well characterized, spatially uniform, etc. These calibrated materials, as described herein, are materials that are sufficiently well-understood to allow calibration of other parts of the CNC machine, such as the laser, cameras, etc. For example, specific materials can be provided that are homogenous, i.e. are substantially free of defects such as knots, cavities, density variations, etc. Other materials can have consistent and well-known optical properties. Another example can be alloys that have a consistent composition throughout. Material calibration data associated with the physical properties of different materials can be accessed by the CNC machine 100 or a remote computing system. A library or database containing of material calibration data can be accessed during operation of the CNC machine 100 or when generating or updating a motion plan. Also, the detailed calibration information may be encoded on the material itself as text, an image, a barcode, an attached device, an embedded microchip, or by some other means. Precise cuts can be executed by the CNC machine 100 by combining the known output of the cutting tool, for example the laser, with the material calibration data. During the cut, or after the cut is completed, the cut can be imaged and compared with expected results given the CNC operating parameters and the type of calibrated material. A detected discrepancy, for example one that is outside of a tolerance that can be predefined or configurable, can result in the system sending an alert to the user that either the CNC machine 100 operation or the material is somehow different than expected.

For example, a laser cutter/engraver might be capable of engraving a calibrated material of 1" acrylic to a depth of 0.5" at 100% power and a speed of 2 inches per second. If it attempted such an engraving and detected that the resulting depth was only 0.4", it would conclude that there was a problem, for example that the laser was aging and its output was reduced, and take appropriate actions such as notifying the operator.

Rather than having the material well-characterized, the material type can sometimes be unknown and the CNC machine can determine what the material is or how best to machine it. In some implementations, the user can determine ideal settings, laser power and head speed for example, by cutting and/or engraving a predetermined test pattern into a piece of unknown material. The test cuts into the unknown material can scan through a variety of possible settings. The settings can be selected by a user or accessed from a computer memory. The cameras can then take images of the material and the user can select visually which areas of the test pattern resulted in their preferred results. The images can be used to determine what settings were used for that part of the test motion plan allowing the user's custom material settings to be saved for future use. In another implementation, the cameras can image the test cuts and automatically determine the best settings based on a comparison with stored test cut images.

Watermarks

Figure 8:
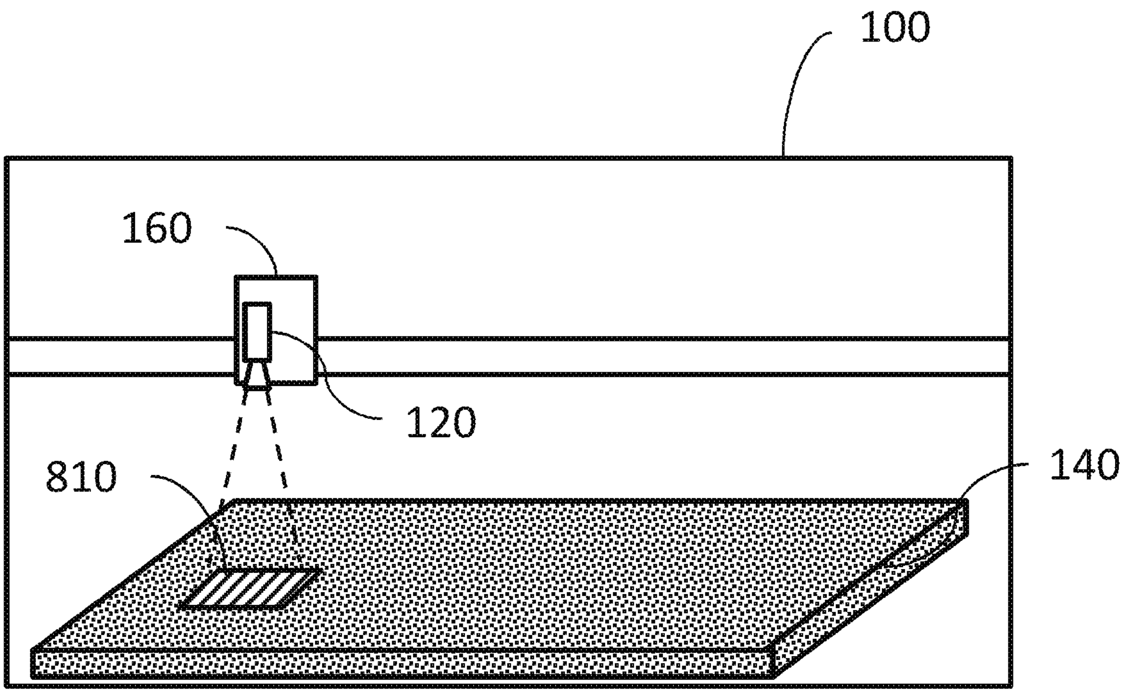
FIG. 8 is a diagram illustrating a head camera imaging a watermark present on material in the CNC machine, consistent with some implementations of the current subject matter.

FIG. 8 is a diagram illustrating the head camera 120 imaging a watermark 810 present on material 140 in the CNC machine 100, consistent with some implementations of the current subject matter. The watermark 810 can be identified from the acquired image and interpreted to identify the material 140 and its properties. The watermark 810 can contain any amount or type of information about the material 140, the allowed use of the material 140, etc. As used herein, the term "watermark" includes any form of material 140 marking, including those described above with regard to calibrated materials.

In one implementation, the watermark 810 can be imprinted on the material 140 or on a cover sheet attached to the material 140. The watermark 810 can be visible, or invisible to the naked eye, such as a UV watermark 810. In some implementations, the CNC machine 100 can contain a light source that illuminates the watermark 810 to be visible to a camera. In one implementation, the watermark may be a QR code that contains data, such as settings or a link to where settings may be found. In another implementation, the mark is repeated on the surface of the material, so that even if the material is cut or part of the surface is obliterated, the remainder of the material has information sufficient to reconstruct the original data.

In addition to the calibration properties described above, the watermark 810 can be used to track the material 140 across different CNC machines. For example, the watermark 810 can be unique to the material 140, and by imaging the watermark 810 and uploading the identity of the CNC machine 100 that is operating on the material 140, the material 140 can be tracked. Also, if a predefined cut pattern, identified by the watermark 140, is to be used with the material 140, the CNC machine 100 can first check for authorization, ownership rights, or the like. If the user does not have authorization to use the cut pattern with the calibrated material 140, then the CNC machine 100 can deny operation to the user. The use, or attempted use, of watermarked materials can be logged on any number of computing systems. The same watermark 810 may also be used for inventory tracking, store stock management, retail checkout, etc.

The watermark may be the same for any similar piece of material, or it may be unique to the individual piece of material. The data on the watermark may contain information necessary to process the material, or simply enough information that the CNC machine can locate the information necessary to process the material, such as a unique identifier that can be looked up in a database. It may have both, with the material processing information in the watermark as a backup in case a network connection is unavailable to look up more detailed information online.

In one implementation, it can be determined that, based on the watermark 810, that particular settings for the CNC machine 100 should be used to execute a desired cut. In another implementation, it can also be determined that, based on the identified material 140, the settings for the CNC machine 100 are not correct for the desired cut. Corrections to the motion plan can be implemented either by user input or automatically by the CNC machine 100. The lack of a detected watermark 810 can also be used to provide an alert to the user that the material 140 is not a characterized or calibrated material. The watermark 810 can also be used to identify different regions of the material 140 that must be treated differently—for example, the calibrated or characterized material can have two or more different regions, a more dense area and a less dense area, requiring different power settings for each one.

In general, the watermark 810 can contain data about the material 140 that can be accessed by a user. For example, the watermark 810 can be associated with a serial number, material 140 name, power settings (for any CNC machine 100) needed for a desired cut, proprietary settings for a particular CNC machine 100, a picture of the underlying material 140, a picture of what the material will look like after processing on the machine with certain settings etc. The watermark 810 can also contain general information, for example comments about the material 140, instructions for a user, recommendations, warnings, etc. In another implementation, the watermark may not contain this information, but contain information sufficient to retrieve it, such as a unique identifier to an online database.

Production Recording

Any of the methods described herein can be recorded by a combination of the lid camera, head camera, or any other cameras in the CNC machine 100. In one implementation, a video data file can be generated by combining recordings of production process, including, for example a design phase, manufacturing phase, a completion phase, etc. The design phase can encompass, for example, recordings of the user scanning or providing the material 140 in the CNC machine 100, development of the motion plan and manipulation of patterns to be engraved or cut, etc. The production phase can include, for example, placing the material 140 in the CNC machine 100, execution of the motion plan by the CNC machine 100, etc. The completion phase can include, for example, any final treatments of the finished product, recording of cooling/setting, and retrieval of the finished product by the user. At any phase, the recording can be coordinated with system activity. For example, if there are pauses in the production process, the recording can also be paused. Also, the recording can end with the lid 130 being opened, or can extend a pre-determined duration beyond that to capture the user retrieving the finished product. The user may be prompted to perform final steps such as assembly and then to re-insert the finished product for imaging, 3-D scanning, or other recording.

At any or all of these phases, the video data files can be transmitted by the CNC machine 100 or other recording computing system to a network, for example, for cloud storage, for live-streaming, to social media feeds, as message file attachments, etc.

Material Thickness Determination—General

A variety of methods can be used to determine the thickness of the material 140 to be cut or engraved. One method can be to determine the height of a top surface of the material 140 and compare this height to a known position of a bottom surface of the material 140. Typically, though not necessarily, the bottom surface of the material 140 coincides with the top surface of the material bed 150, which can be of a known height. The difference between the height of the top surface of the material 140 and the height of the bottom surface of the material 140 can then be determined to be the thickness of the material 140. In another implementation, the process used to determine the thickness of the material 140 can be calibrated by measuring a material 140 with a known thickness. For example, an object with a 1 cm thickness can be placed on the material bed 150. Data can be acquired by the cameras and the data can be associated with the known thickness of the object. In another implementation, the cameras can determine the height of the surface the material 140 is resting on. For example, if there are other pieces of material 140 between the topmost material 140 and the material bed 150, the cameras can measure the height of the topmost surface before material 140 is inserted or measure the height of the topmost surface in a location not obscured by the material 140.

In one implementation, the height at different points can be measured, for example in a grid pattern, on the surface of the material 140 in order to characterize the curvature of the material 140. Once the height at many points on the material 140 is known (and consequently the surface curvature), instructions can be generated so that one or more actuators can follow the curve of the material 140. For example, a cutting laser can be kept in focus, a camera can be kept in focus, a 3D printer head can maintain a constant separation from the material base, or a CNC milling bit can be kept a constant distance from the material 140.

Once the distance between the surface and a lens (or any other reference point in the CNC machine 100) is known, this can be incorporated to precisely control the height of the head 160 (and optics internal to the head 160) when machining.

Contrast detection, phase detection, or any other distance finding techniques described herein can also be implemented on other machines, for example, a CNC mill where the distance determines where the head 160 is to position a bit. In this way, the motion plan can incorporate, for example, contrast detection, autofocus, etc. to perform real-time analysis of the position of the material 140 and/or the position of the head 160 relative to the material 140.

Material Holding

While knowing the position of surface of the material 140 is important, and the surface position (or height) can be easiest to measure, the thickness of the material 140 is also important. If the material 140 can be pressed flat, for example against the material bed 150, then the height of the top of the material 140 minus the height of the material bed 150 equals the thickness. For that reason, methods for holding the material 140 firmly to the support can be combined with any method for measuring the thickness of the material 140. This can be helpful in situations where the material 140 may have a natural tendency to flex or bow, or where the material 140 may be lightweight and have air pockets underneath.

In one implementation, there can be at least one plunger that can hold the material 140 firmly against the support. The plunger can be proximate to the point of cutting, or can be at another location or locations on the material 140. Also, the position of the plunger itself can provide a cross check to any optical determination of material 140 thickness, if for example, the height of the surface of the plunger is known relative to the surface of the material bed 150.

In another implementation, the material bed 150 can be a vacuum table with a number of apertures extending through the surface to a vacuum system. The vacuum system can create a negative pressure through the apertures and underneath the material 140, which is then held down against the vacuum table by the pressure difference on either side of the material 140.

There can be situations where the material 140 is unable to be pressed against the material bed 150, for example, curved metal pieces, stone, etc. If the material 140 is known to be of a constant thickness, then the thickness can determined from a measurement at any location on the material 140. If the material 140 contacts the reference surface at or more points, then a determination of the lowest point on the surface of the material 140 can be interpreted by the CNC machine 100 and compared to the height of the material bed 150 in order to determine the thickness of the material 140. In the case where the material 140 thickness is measured in multiple locations, but not at the location where the surface is lowest, a map can be created from the points measured. The slope calculated from existing points may be used to identify a likely area for a local minimum, which can in turn be sampled for more accurate measurements.

Material Thickness Determination by Stereoscopy

One method for determining the height or position of surface features of the material 140 can be to perform stereoscopic observations of the material 140 in order to determine a depth profile of the material 140, using either multiple cameras or multiple images from the same camera (moving between each exposure) to determine distance. In one implementation, the stereoscopic measurements can be performed by one or more lid cameras and/or head cameras. There can also be additional cameras dedicated for this purpose positioned within the CNC machine 100. Here, the multiple images required for producing a stereoscopic image can be interpreted by an image analysis program in order to determine, based on the differences between the images taken at different angles, the depth of the features imaged on the material 140. To determine the height of the surface of the material, images are captured from two separate cameras, and one or more features on the surface of the material are isolated and considered. The amount by which the observed feature moves between the two camera images indicates its distance and thus the height of the material, in the same manner that human binocular vision uses to determine distance.

In some implementations, a motion plan can be created that includes positioning the head 160 such that a distinctive feature to be measured is within the view of a camera located on the head 160. Then, the camera can acquire an image of the feature. A second motion plan can be created (or a second step in a single motion plan) to move the head 160 by a fixed amount. After the head 160 moves, the feature should be within view of the camera. A second image, containing the feature, can then be captured by the camera. In each of the images, the feature is identified. An image analysis program can then measure how much the feature has moved in each image, relative to the amount of camera movement. Based on the relative apparent movement, the height of the feature can be determined. In general, the closer the feature is to the camera (i.e. height of the feature) the more it will appear to have moved.

Material Thickness Determination by Interferometry

Another method of acquiring the distance to the surface of the material 140 can be to include an imaging laser and an imaging detector to perform interferometry on the surface of the material 140. Here, light from the imaging laser can be used to reflect off the surface of the material 140 and then be directed to a detector. Light from the imaging laser can also be directed to a reference mirror and then also to the detector. The changing number of interference fringes at the detector can be detected and counted in order to determine the distance to the surface of the material 140. In one implementation, a laser output from the head 160, for example that used for cutting, can also be used as the imaging laser. Alternatively, the imaging laser does not have to be a laser, it can be any light source of known wavelength, for example, an atomic lamp, a band-pass filtered light source, etc.

Material Thickness Determination by Contrast Detection

In another implementation, an algorithm that takes multiple images with a camera having a known focal plane when each image is taken can use a variation in focal plane to determine the distance to the surface of the material 140 by determining the image with the maximum contrast. In this implementation, images of the material 140 can be taken by the head camera 120, the lid camera 110, or any other camera in the system that has the ability to adjust its focus, either by changing its position or the position of a lens. The analysis can involve varying the position of the one or more lenses until the image of the material 140 taken by the head camera 120 has a maximum contrast. When this condition is detected, the focal plane of the camera is the same as the distance from the lens to the surface of the material 140, so the height of the surface of the material 140 is known.

In some implementations, the lens can be moved to a first location, for example the top of its range in the camera or in the head 160. An image can then be acquired at that first location. The contrast can be quantified, for example, by taking a Fourier transform of the image and measuring the amplitude of the high-frequency components characteristic of a rapid change in the image. Then, the lens can be moved to a second location, for example lower in the cameras range. The contrast can be quantified after each movement, while moving the lens in the direction that results in an increase in the determined contrast. The lens is in focus when at a location where the contrast is a maximum.

Material Thickness Determination by Phase Detection

In one implementation, phase detection can be used in order to determine distance from a lens to the material 140. In this implementation, images taken of a material 140 are divided into at least two portions corresponding to light passing through at least two different parts of the lens symmetrically arranged to be imaging the same location when the lens is at its focal length from the material 140. The intensity or other image features of each portion can then be compared. The position of the lens can be adjusted until the portions imaged through each of the parts of the lens are substantially identical. When that is complete, the focal length of the lens is the distance of the material from the lens.

Material Thickness Determination by Time of Flight

In one implementation, time-of-flight techniques can be used to determine distance from a source to an object in the CNC machine 100. For example, there can be a light source that emits pulses or other known waveforms of light. A detector can detect the light reflected off a surface. By measuring the time between emission and detection and knowing the path between the source and the detector, the distance between the source (or detector) and the object can be determined. A similar procedure can be performed with a sound source. The time-of-flight can be measured by the detector based on rising or falling edges of a signal, interference patterns, signal ring-down, etc.

Material Thickness Determination by Imaging a Spot Location/Shape

Figure 9:
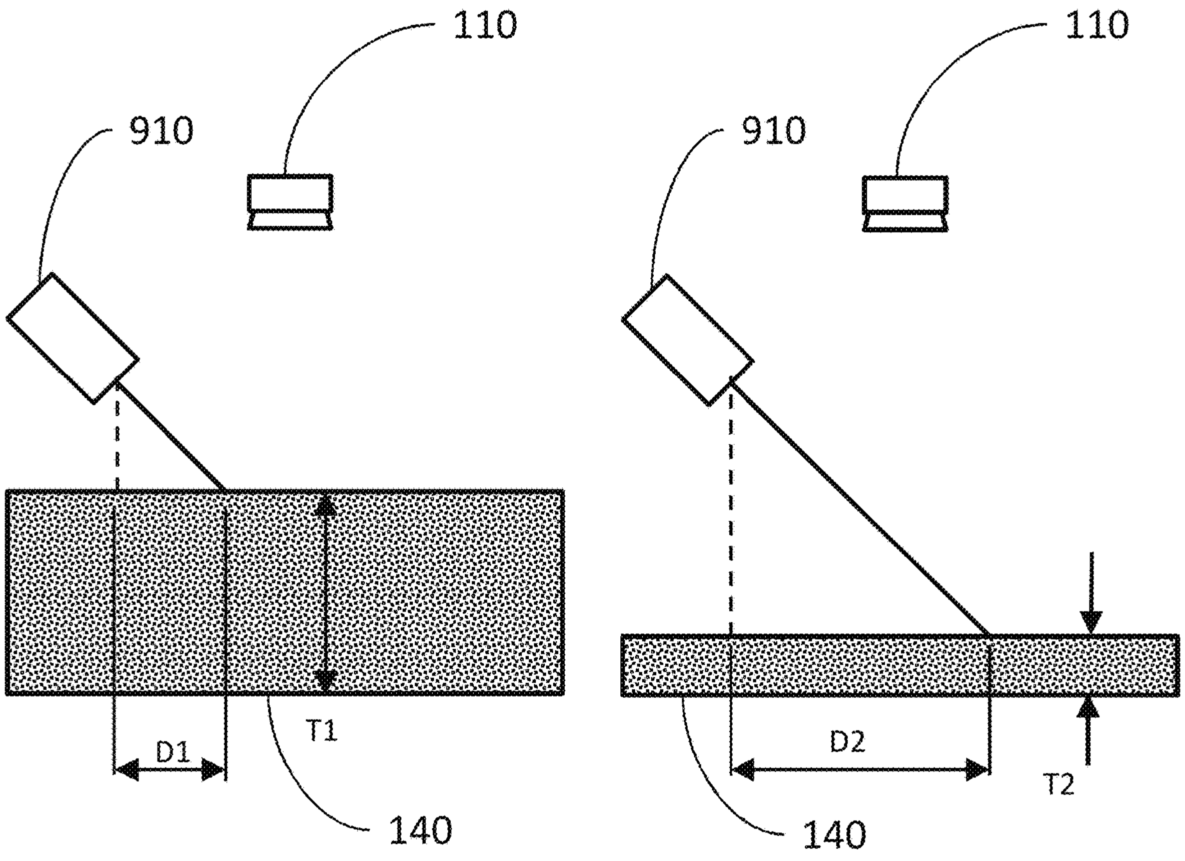
FIG. 9 is a diagram illustrating the determination of material thickness by the lid camera imaging a spot on the material produced by a distance-finding light source, consistent with some implementations of the current subject matter.

FIG. 9 is a diagram illustrating the determination of material 140 thickness by the lid camera 110 imaging a spot on the material 140 produced by a distance-finding light source 910, consistent with some implementations of the current subject matter. In one implementation, a well-collimated light beam from the distance-finding light source 910, for example from a laser diode or LED with a tight beam, can be pointed at the material 140 at an angle. As shown in the left pane of FIG. 9, a thicker material 140 (of thickness T1) will intercept the beam sooner, at a distance D1 from the distance-finding light source 910, causing the intersection spot to be visible to the lid camera 110 closer to the distance-finding light source 610. As shown in the right pane of FIG. 9, thinner material 140 (of thickness T2) will allow the beam to travel farther, so the beam will appear to intersect the material 140 farther (at distance D2) from the distance-finding light source 910. The location of the bright spot on the material 140 can thus be directly proportional to the thickness of the material 140. In other implementations, the distance-finding light source 910 can be cameras other than the lid camera 110, or any combination of cameras in the CNC machine 100.

In another implementation, the distance-finding light source 910 can have a measureable divergence. If the material 140 is thick, then the spot on the surface of the material 140 will appear to be small. If the material 140 is thin, then the spot will be larger, as the light will have diverged more before it intersects the material. The thickness of the material 140 can be determined using a trigonometric calculation based on the known divergence angle and the measured size of the spot on the surface.

In a related implementation, the focal length of the distance-finding camera can be made to be as small as possible. If the beam spot is near to the camera it will be in focus and therefore appear smaller; if it is far away, it will be blurry and thus larger and dimmer. This technique may be combined with the divergence technique to make the increase in spot size even more easily detected.

Material Thickness Determination by Imaging Laser Spot Size

Figure 10:
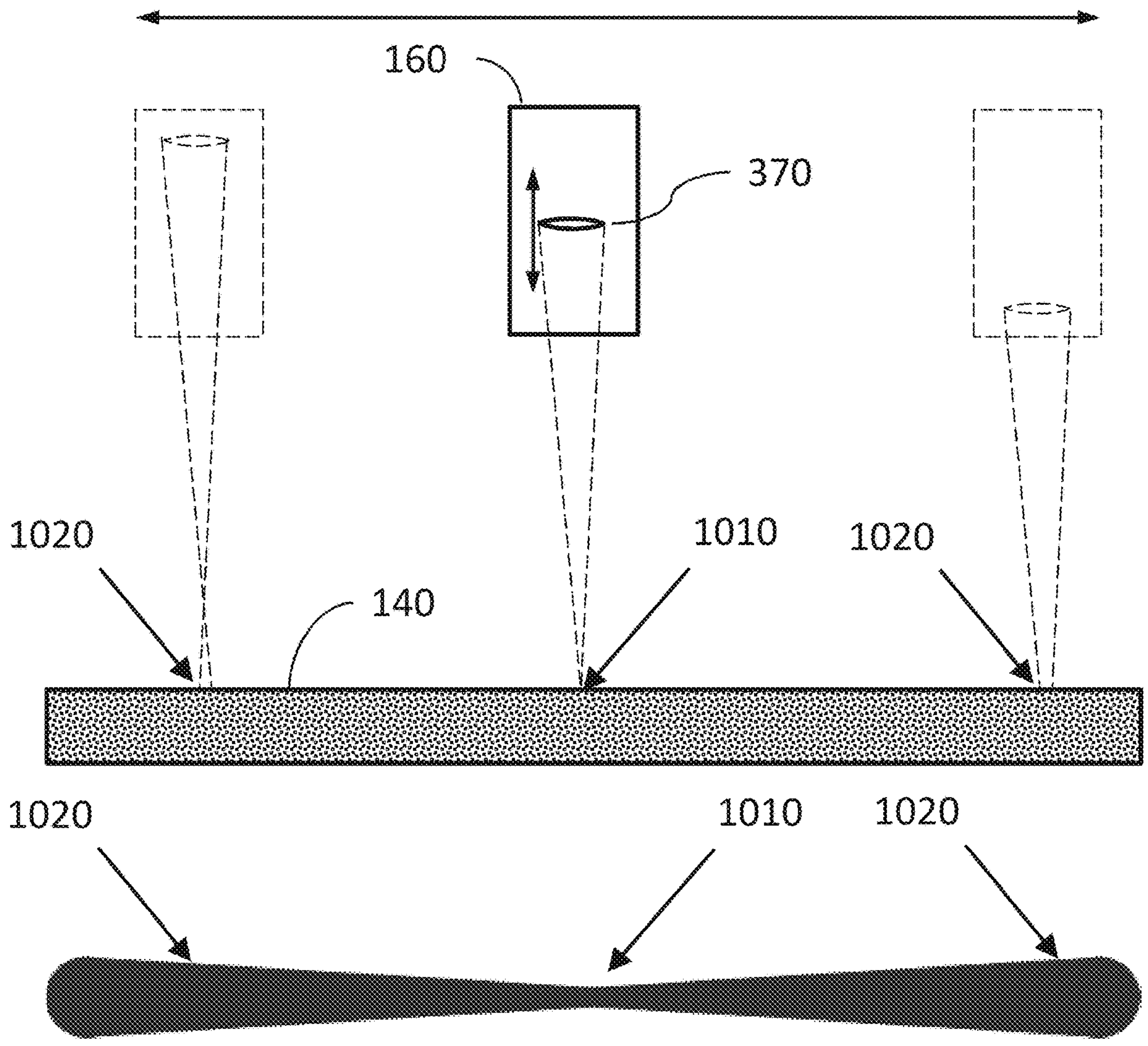
FIG. 10 is a diagram illustrating determination of material thickness by imaging a laser spot size, consistent with some implementations of the current subject matter.

FIG. 10 is a diagram illustrating determination of material thickness by imaging a laser spot size, consistent with some implementations of the current subject matter. To provide precise cuts, the laser should be focused at the surface of the material 140. If the laser is out of focus, the cut can be larger than expected and the cut may have a different depth than desired. In one implementation, if a lens 370 in the head 160 specifies a particular focal point for the laser, then a minimum spot size 1010 can be measured by a camera viewing the laser spot on the surface. Conversely, if the material 140 is not at a distance equal to the focal length of the lens 370, then the spot size 1020 will be larger. By measuring the spot size, the lens 370 in the head 160 can be adjusted until the laser spot size is either at a minimum, or other known size, which corresponds to the surface of the material 140 being at the focal length of the lens 370. In some implementations this adjustment can be done automatically and/or continuously in order to provide a constant power density at the surface of the material 140. As a result, a consistent cut can be provided even if the thickness of the material 140 changes. Also, if there is a discrepancy between the observed spot size and the expected spot size, then either the "known" focal length of the lens 370 is inaccurate or the determination of the surface height is inaccurate. Indications of these inconsistencies can be provided to the user or otherwise logged by the CNC machine 100. The laser used for this may be the primary cutting laser, or a secondary laser (typically lower-power laser at a frequency that is viewable more readily with a camera, such as a helium-neon laser). The spot size may be observed directly if the secondary laser is at a frequency that the camera can register, or indirectly by looking at the size of the discoloration, engraving, or cut produced by the secondary laser.

In one implementation, the cutting laser can be used to draw a line (shown by the solid horizontal shape in FIG. 10) by moving the head 160 across the material 140 while the laser is operating. While the laser is moving, the focusing lens 370 acquires images as it travels through its full range of motion. When the motion is complete, camera images of the line are analyzed and the narrowest portion is determined. The lens position at the moment the narrowest portion of the line was created corresponds to the point where the beam is in focus, and the moment at which the distance between the lens 370 and the material equals the focal length of the lens, allowing both the laser to be focused and the distance to be determined for other purposes, such as reporting the thickness (measured from the height of the material surface) to the user.

Direct Inspection of Material Thickness

In another implementation, the material 140 can be imaged by a camera at a low angle relative to the surface of the material. The angle can be, for example, 0 degrees (parallel to the surface), less than 5 degrees, less than 10 degrees, etc. This "edge-on" view allows a direct determination of the height of the material. Here, an image of the material can be acquired. The height or thickness of the material 140 is related to the number of pixels of the material in the image. In some implementations, a distance measurement between the camera and the edge of the material can first be performed. Based on the distance from the camera to the edge which is being imaged, a conversion can be performed between the height in pixels and the material height.

Cut Inspection

Figure 11:
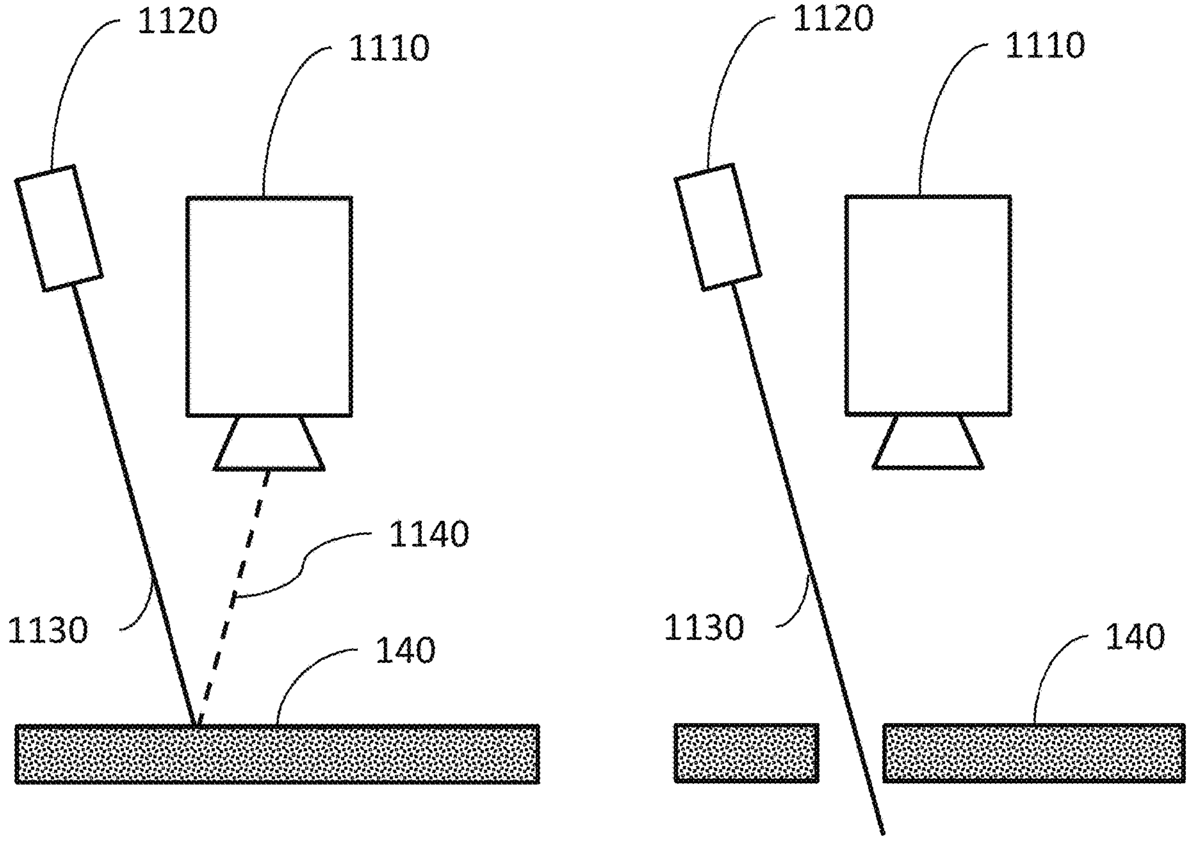
FIG. 11 is a diagram illustrating a scattered light detector determining if a cut extends through the material, consistent with some implementations of the current subject matter.

FIG. 11 is a diagram illustrating a scattered light detector 1110 determining if a cut extends through the material 140, consistent with some implementations of the current subject matter. In some implementations, a laser combined with a photosensor can provide information down to a single point at a very precise location, for example, probing a cutline to see if the material 140 has been cut through. In this example, as shown in the left half of FIG. 11, a laser 1120, which can be a low-powered laser used only for this purpose, projects a beam 1130 onto a point on the uncut material 140. A photodiode 1110 can then detect the scattered light 1140 indicating that the material 140 has not been cut. As shown in the right half of FIG. 8, when the laser 1120 strikes material 140 that has been cut, there is no scattered light to be detected by the photodiode 1110. In this example, the accuracy may be enhanced by selecting a photodiode 1110 that is sensitive to the laser wavelength, by filtering only for that wavelength, or by capturing successive images with the laser 1120 turned on and off, then subtracting them, so that only the illumination provided by the laser 1120 is visible and background light is cancelled out and not analyzed. Such approaches can also result in enhancing the image by increasing contrast.

In other implementations, cameras can be placed to inspect a cut by imaging the bottom of the material 140 to verify that the material 140 has been cut through. The focal plane of a camera viewing through the cut can be varied to scan the vertical edge of the cut for defects. A particular focal plane can be specified with focus adjustment and then blurriness can be used as an indicator of depth. In some implementations, a camera can be used where the depth-of-field (an area on the focal plane) is sufficient to image both sides of a cut.

Location Sensing

Traditionally, a variety of systems are used to detect machine position. There can be encoders on the motor, on the shaft, and/or mechanical switches that detect when the machine is in extreme positions or to "reset" the software's internal estimation of the head position to a correct, known state.

These can be replaced by camera systems. An overhead camera can visually locate the head 160 or other parts of the system. A camera mounted on the head 160 can detect when the head 160 has been moved to a specific location, for example over a target printed on a home location, with extreme accuracy. In some implementations, the image data from any camera in the CNC machine, can be processed to generate data including, for example, a position or any higher order derivative thereof, such as a velocity, an acceleration, and so on. The image data can also relate to anomalous conditions, such as fires, smoke, etc. The image data can further relate to non-anomalous conditions, such as normal operation and movement of the CNC machine components. Any of the actions of the CNC machine 100 described herein can be initiated or terminated based on the generated data.

Head Motion Detection

The wide view camera(s) can determine position, velocity, acceleration, and other motion parameters for the head 160. A camera mounted on the head 160 can do this by observing the apparent motion of the material 140 in the images it acquires through a variety of techniques, such as comparing sequential images or observing motion blur. Special purpose cameras can be used that are optimized for this, for example the image sensor on an optical mouse may be repurposed for the head 160 to precisely measure its travel. A camera mounted on the lid 130 or elsewhere, with a view of the head 160, can monitor the head 160 directly.

Observation Points

Additional features can be included in the CNC machine 100 to assist with recognition. Generally, marks or other indicators can be added to the CNC machine 100 that do not require sophisticated image recognition programs to process. Rather, changes to the images that include the marks can indicate a particular condition. For example, a distinctive mark or reference point can be defined on the head 160 in order to better locate it precisely. By mapping the reference point on the head 160, shown in the image data, to a coordinate in the CNC machine 100, the position (or coordinate in the CNC machine 100) of the head 160 can be determined. A camera need only track 220 the mark and not interpret the remainder of the image of the head 160. An LED can be placed in the CNC machine 100 and activated in a particular pattern, similar to a beacon; the pattern can be observed in video, or by taking multiple images synchronized with the flashing of the beacon. A small flag can be placed in an airflow location so a camera monitoring the flag can easily detect if the air is moving or not. A chemically reactive area, like a pH strip, can be placed within view of the camera so that the machine can observe color changes to detect different chemicals in the air, for example if a laser is cutting something that emits harmful fumes. An expansion module or other accessory can be added to the CNC machine 100 and detected via the camera by virtue of a unique design or barcode. Marks can be printed on any surface in the CNC machine 100 so that the camera can observe when the moving parts of the system obscure them, allowing for better measurement of position of the moving parts.

Restart after Pause

Processing often has intermediate steps. For example, to protect from soot buildup, the user may make a light cut, then mask the material 140 with tape, then make another light cut, then lay down more tape, then make a final cut. In another example, the user may make a small cut, inspect the cut, then continue.

Normally this is difficult because any disturbance of the material 140 means that subsequent processing operations are not aligned with the operations performed so far. For example, if the user is cutting a square and removes the material 140 mid-process, the second half of the operation will not be properly aligned with the first half, even if the operator is very careful when replacing the material 140.

However, the cameras and image recognition system can be used to determine exactly where the material 140 was and where it has been replaced, correcting for any shift in the material 140 resulting from the replacing, thus allowing the operation to continue seamlessly. After the interruption, the material 140 can be re-imaged and the cut pattern aligned with the new (if changed) orientation of the material 140. This can be accomplished through registering by any or all of the mechanisms mentioned previously including grain pattern, past cuts, fiducials, and the corners of the material. The motion plan can be updated and executed based on the re-aligned cut pattern. This feature can allow, for example, a user to remove the material 140 from the CNC machine 100, inspect it, and then replace the material 140 without having to perform any manual alignment.

In another example, there can be a process where five sheets of material 140 are each cut with different patterns, set aside e.g. to be painted, and then cut a second time. The system could recognize each sheet when it is re-inserted based on its shape, texture, and/or previous cuts, and pick up from where it left off.

Image-Based Anomaly Detection

If a problem, error, malfunction, or other off-normal condition should exist in the CNC machine 100, they can be detected by a combination of cameras and sensors. For example, if the machine is bumped and the material moves, the cameras can see the material slide and notify the software to compensate for the new location. The cameras can detect a physical failure, for example a screw falling out, as the original part appears to be missing a screw. The cameras can also detect a buildup of smoke, indicating a failure of the exhaust system. This may be accomplished by imaging smoke particles crossing through a visible laser beam, detecting light scattered from internal illumination back towards the camera from smoke particles (differential imaging will assist with this), image recognition of actual plumes of smoke, or other methods. It can also be observed by the cameras that the head is not moving when it is supposed to, for example if a belt is broken. Many other features and implementations of detecting anomalies and processing of sensor data are given below.

Air Filtering and Cooling System

An air filter, optionally including one or more fans, can be integrated into the housing of the CNC machine 102 to remove smoke or other particulates. In one implementation, the air filter can have a predetermined configuration that connects the air filter to a specific location on the housing. The air filter can be located, for example, beneath, but directly connected to, the housing. The CNC machine and the air filter can share a common boundary, for example if the air filter forms at least a portion of the base of the CNC machine. Because the configuration is predetermined, there can be a rigid pre-aligned duct between an intake on the air filter to and the housing of the CNC machine 102.

The operation of the air filter can be based on, in part, data about the type of material cut, operating parameters, sensor data that measures debris and/or smoke, etc. This operation can be also integrated into the motion plan. For example, the air filter can speed up or slow down depending on the motion plan specifying cutting more material and generating more smoke. With known materials and a pre-defined motion plan, the amount of smoke can be estimated based on information in a data library. The estimate of smoke can be used to update the motion plan and modify air filter operation to handle the expected smoke or particulate generation.

In this way, the CNC machine 100 communicates with the air filter to implement updated instructions in the motion plan. The communication can be electrical, infrared, near-field communication, BLUETOOTH, etc. The air filter operation can be tied to conditions in the CNC machine, for example, light from light emitting diodes, sounds, turning off when exhaust fans are off, detecting pressure changes, etc. The fans/air filters can optionally be independent from operation of the CNC machine and instead communicate directly with a remote computing system to manage fan/air filter operation.

The lifetime of the air filter can be continually updated based on the materials used, cutting operations, measured debris, air flow measurements through the air filter, etc. Operation of the fans can also be based on a desired noise level, a desired filtration rate, or both. For example, a user can specify that quiet operation is a priority and the CNC machine 100 can respond to operate the fans at a lower setting despite the detected presence of particulates. Observations made in the machine e.g. smoke levels observed by cameras can be used to measure the efficacy of the filter, for example detecting when the airflow is reduced and so the filter medium needs to be changed or the fans replaced.

The cooling system can also be interfaced with the air filtration system and internal sensors that monitor component temperatures, smoke, and/or debris. The cooling system can be completely internal to the CNC machine 100, for example, a liquid cooling system for a laser that uses heatsinks and fans to dissipate heat, optionally assisted with Peltier or “solid state” devices to drive temperatures below ambient. In the event that the cooling system is unable to maintain a component within a specified temperature range, the CNC machine 100 can halt execution of the motion plan until the component has cooled. Once the temperature for the component is within an acceptable range, then the motion plan can resume. A cooling system may also be external, for example a chiller that cools water used in turn to cool a laser; this cooling system may interface directly with the server controlling the CNC machine so that it can provide critical information on coolant temperature etc. Similar to the operation of the fans/air filters, the cooling system can also be updated according to conditions in the CNC machine. The cooling system can also be interfaced with a remote computing system to enable operation independent from the CNC machine 100.

Improved Imaging

There are further methods that can be incorporated, in any combination, to improve image recognition when performing any of the techniques described herein. In one implementation, the material 140 can be first imaged with a first camera such as the wide-angle lower-precision lid camera 110 to determine where edges are approximately or to identify areas that are out of range of the field of view of the lid camera. Once the approximate edges are known, or there are areas that need to be further imaged in order to determine where the edges are, a second camera such as the close-up head camera 120 can be moved to image the edges in order to determine the exact location of the outline of the material 140. If neither the head camera 120 nor the lid camera 110 can determine the extents of the material 140, the user can be alerted that the material 140 is too big, that the material 140 needs to be repositioned, etc. In an alternate implementation, a single camera might reorient itself, refocus, take a higher resolution picture, or otherwise use the initial image to determine that a more thorough inspection is required.

In some implementations, portions of images acquired by the cameras can be reduced to acquire either smaller or simpler images. For example, if only an image of a small area is desired, but the camera has an unnecessarily large field of view compared to the size of the area, an image can be acquired and masked or cropped. The masking can eliminate entirely the unneeded area, reducing the pixel size of the image. Alternatively, the masking can make the unneeded pictures a particular color, for example, black, white, green, etc. The masked color can then be easily identified in software as an unneeded area and not analyzed. In another implementation, a physical masking technique can be used, such as with a diaphragm.

Other techniques can be implemented to provide sharper images for image analysis. First, any laser used for range finding (the cutting laser, if visible, or a secondary laser), can be modulated in order for the cameras to acquire images of the material 140 with and without contamination due to exterior light, like room lighting, reflected laser light, or burn flashes. There can also be internal light sources in the CNC machine 100 that can be modulated to provide image data on internal light conditions. For example, a first image can be acquired with the internal light source on. Then, a second image can be acquired with the internal light source off. The second image would correspond to external lighting only. The image analysis program can subtract the second image from the first image in order to determine an interior light profile that was due only to internal sources inside the CNC machine 100. The interior light profile can be used by further processes of the image analysis program when analyzing images taken in the determining of, for example, distances, cutting behavior, material appearance, etc.

Other implementations can include using RGB controllable light sources in the CNC machine 100 or for the laser. Examining the material 140 under different color lighting can identify which color illumination provides the most information. IR illumination and cameras can also be used in cases where it provides better information than visible light. Cameras can be used in sequence if one particular camera is saturated with a color. Black-and-white cameras can be combined with images illuminated with red, green, and blue light to extract a color image. Filters, such as a bandpass filter, can be placed on cameras so they only receive a certain color of illumination—for example, only the 633 nm red colored light, dominantly from a laser diode in the head 160, effectively ignoring all other light sources. Multiple images can be stitched together to get a larger image, for example, when performing a high-resolution scan with the head 160 of the entire surface of a material 140. A linear scanning element can be used to scan a line over the surface instead of a point, with the scans combined to form a continuous image. A single point detector can be instead of a camera element, for example, a single photodiode.

The resolution of images can be improved beyond the pixel limit of a particular camera by introducing a random perturbation to the location of the camera. The camera can be vibrated a small, random amount or alternately moved a predefined distance such that a histogram of the camera’s location can define a probabilistic function. Camera images are acquired during the camera movements. For example, the head camera could be moved around in small, known steps, which could then be offset so the images can be aligned, combined, and averaged. In another example, the lid camera can be moved miniscule amounts by introducing a random or nearly random vibration, for example by running exhaust fans at full speed; the results would be averaged. In one implementation, this function can be a Gaussian shape where, a particular imaged feature can be distributed amongst pixel-sized bins within the Gaussian.

Upon acquiring sufficient statistics, the envelope of the Gaussian can be defined and the centroid identified to an intra-pixel location. The location of the centroid, defined now in terms of the Gaussian profile resulting from the motion of the camera, can be associated with the location of a particular feature in the image. While the probabilistic function can be a Gaussian, any distribution of known probability density can be used.

The distance of an object with known extents can also be determined by its apparent size in an image. In some implementations, the size or dimensions of an object in the image data, in pixels, can be compared to another image of the same object, or portion thereof. The change in pixels, whether a linear measure, an outline, an area, or any combination thereof, can be incorporated with a mapping or transfer function that relates the change in pixels to a change in distance. For example, an image of 1" square at a given distance from a camera might occupy 100×200 pixels. If the camera moved away from the square, the image of the square could change to 50×100 pixels. The change in pixel size is directly related to the change distance, but also a function of the angle of the camera, the direction of displacement of the material 140, and the optical features of the camera system (e.g. image distortions or optical aberrations).

Image Aberration Correction

Figure 12:
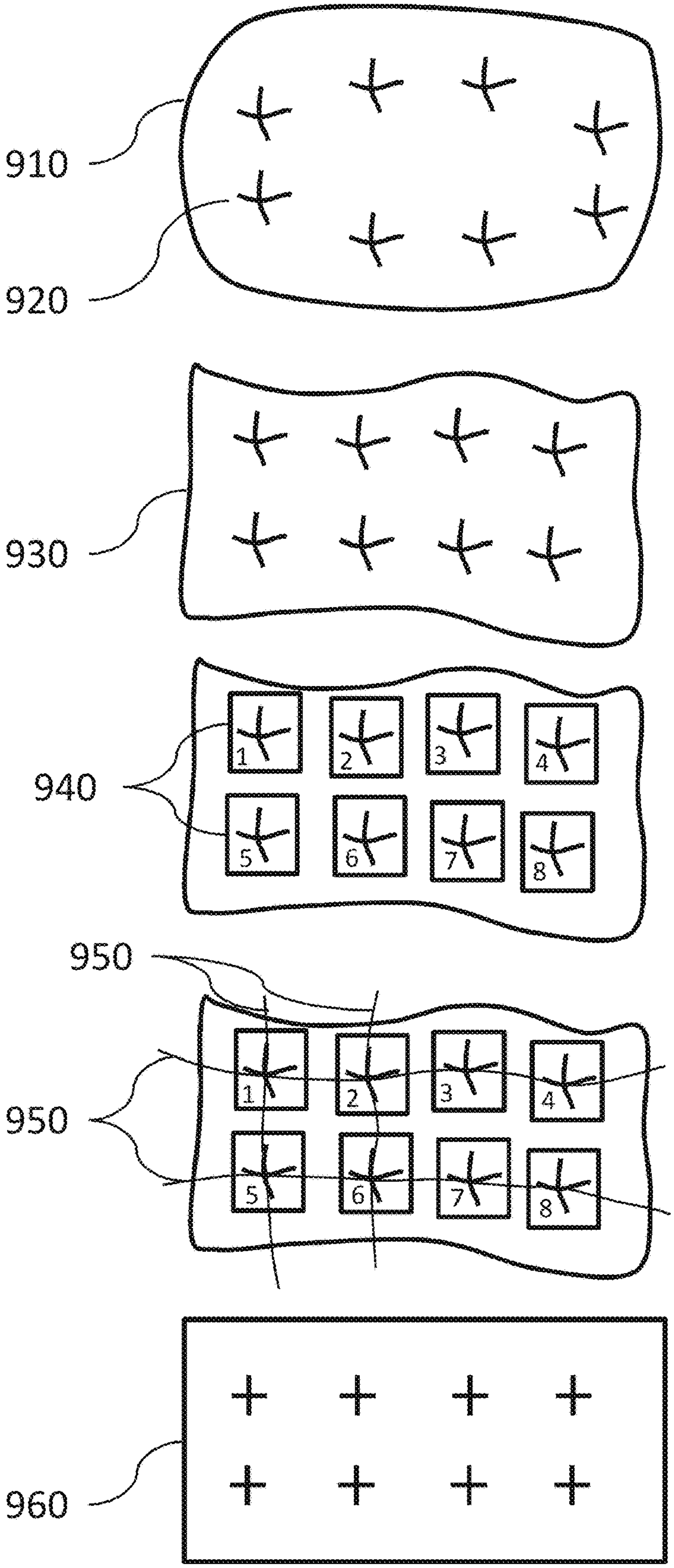
FIG. 12 is a diagram illustrating correcting aberrations in images acquired by a camera with a wide field of view, consistent with some implementations of the current subject matter.

FIG. 12 is a diagram illustrating correcting aberrations in images acquired by a camera with a wide field of view, consistent with some implementations of the current subject matter. A principal challenge of wide-angle imaging inside a small working space with the unit closed is the distortion introduced by the wide-angle lens required. Images from cameras, particularly those with a wide field of view, can suffer from multiple types of distortions. In one implementation, an image correction program can be executed to convert distorted image data 1210 (which can be considered to be the sum of a perfect image and a distortion) to corrected image data 1260 (which can be either a perfect image or at least an image with reduced distortion). The distortion correction can include processing an image to achieving one or more (or optionally all of) removing the distortion, enhancing the image by increasing contrast, and mapping pixels in the image to corresponding physical locations within the working area, or other areas in the CNC machine. The distortions can be due to optical components in a camera, such as a wide angle lens, the de-centration of an imaging sensor within said lens, chromatic aberrations, reflections or reflectivity, damage or undesirable coatings on the lens, etc. These distortions can be compounded given external factors related to the orientation of the camera 110 with respect to the material bed 150 it is observing as a result of its mount on the lid 130 including the camera's position, rotation and tilt. After making the corrections, the image data can be replaced with, or used instead of, the corrected image data prior to identifying conditions in the CNC machine 100 or performing further image analysis.

In another implementation, the conversion can be performed by imaging one or more visible features 1220 shown in the distorted image data. In the example shown in FIG. 12, the visible features 1220 can be crosses distributed with a known distance separation across a surface of an object. The distorted image 1210, which includes the visible features 1220, can be acquired. A partially de-distorted image 1230 can be generated by applying a barrel de-distortion function to the distorted image 1210. The partially de-distorted image 1230 can be separated into smaller images 1240, with each of the smaller images 1240 including only one of the visible features 1220. The plurality of smaller images 1240 can be sorted (as shown by the numbering in the smaller images 1240), based on coordinates of the visible features 1220, into at least one set of visible features, the set of visible features being approximately co-linear. For example, smaller images 1, 2, 3, and 4 can be determined to be co-linear (in the X direction) and smaller images 1 and 5 can be determined to be co-linear (in the Y direction). Mathematical expressions for a line 1250 that passes through each of the coordinates can be calculated for each of the set of visible features and based on the coordinates of the visible features 1220 in the corresponding set. The line 1250 can be, for example, a polynomial fit to the set of visible features 1220, a spline, etc. The distorted image data 1210, at any point in the image data, can be converted to the corrected image data 1260 by applying a correction to the distorted image data 1210 based on an interpolation of the mathematical expressions to other points in the distorted image data 1210. For example, the interpolation can be between lines 1250 that extend in two orthogonal directions (i.e. a grid pattern shown in FIG. 12). The linear distance between the interpolated lines can correspond to less than 5 pixels, less than 3 pixels, or a single pixel. Optionally, coarser interpolation can be used that extends over more pixels than those mentioned previously.

Figure 13:
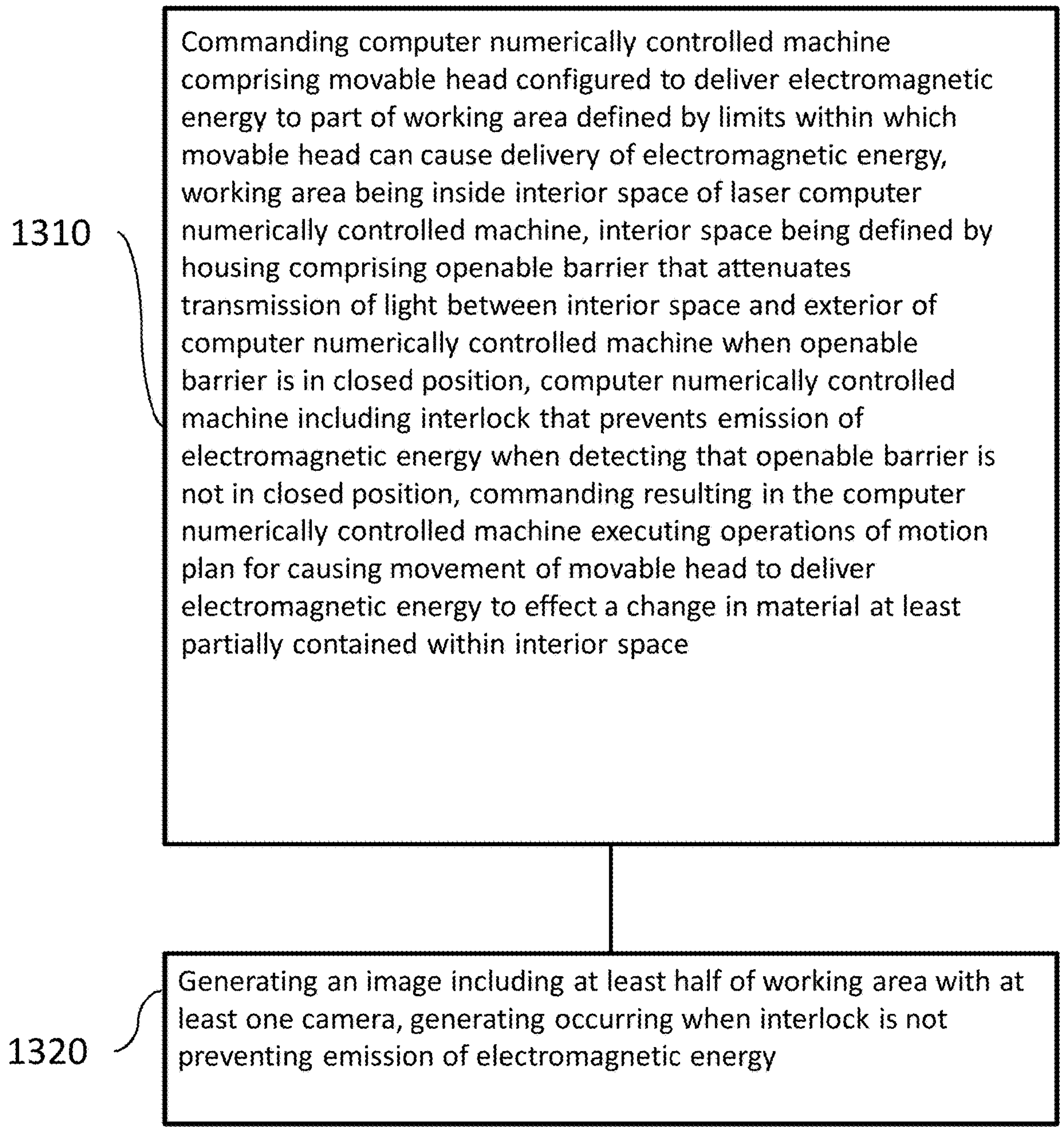
FIG. 13 is a process flow chart illustrating features of a method consistent with implementations of the current subject matter.

FIG. 13 is a process flow chart illustrating features of a method consistent with implementations of the current subject matter.

At 1310, a computer numerically controlled machine can include a movable head configured to deliver electromagnetic energy to a part of a working area defined by limits within which the movable head can be commanded to cause delivery of the electromagnetic energy. The working area can be inside an interior space of the laser computer numerically controlled machine. The interior space can be defined by a housing can include an openable barrier that attenuates transmission of light between the interior space and an exterior of the computer numerically controlled machine when the openable barrier is in a closed position. The computer numerically controlled machine can include an interlock that prevents emission of the electromagnetic energy when detecting that the openable barrier is not in the closed position. The commanding can result in the computer numerically controlled machine executing operations of a motion plan for causing movement of the movable head to deliver the electromagnetic energy to effect a change in a material at least partially contained within the interior space.

At 1320, an image can be generated including at least half of the working area with at least one camera. The generating can occur when the interlock is not preventing the emission of the electromagnetic energy.

Figure 14:
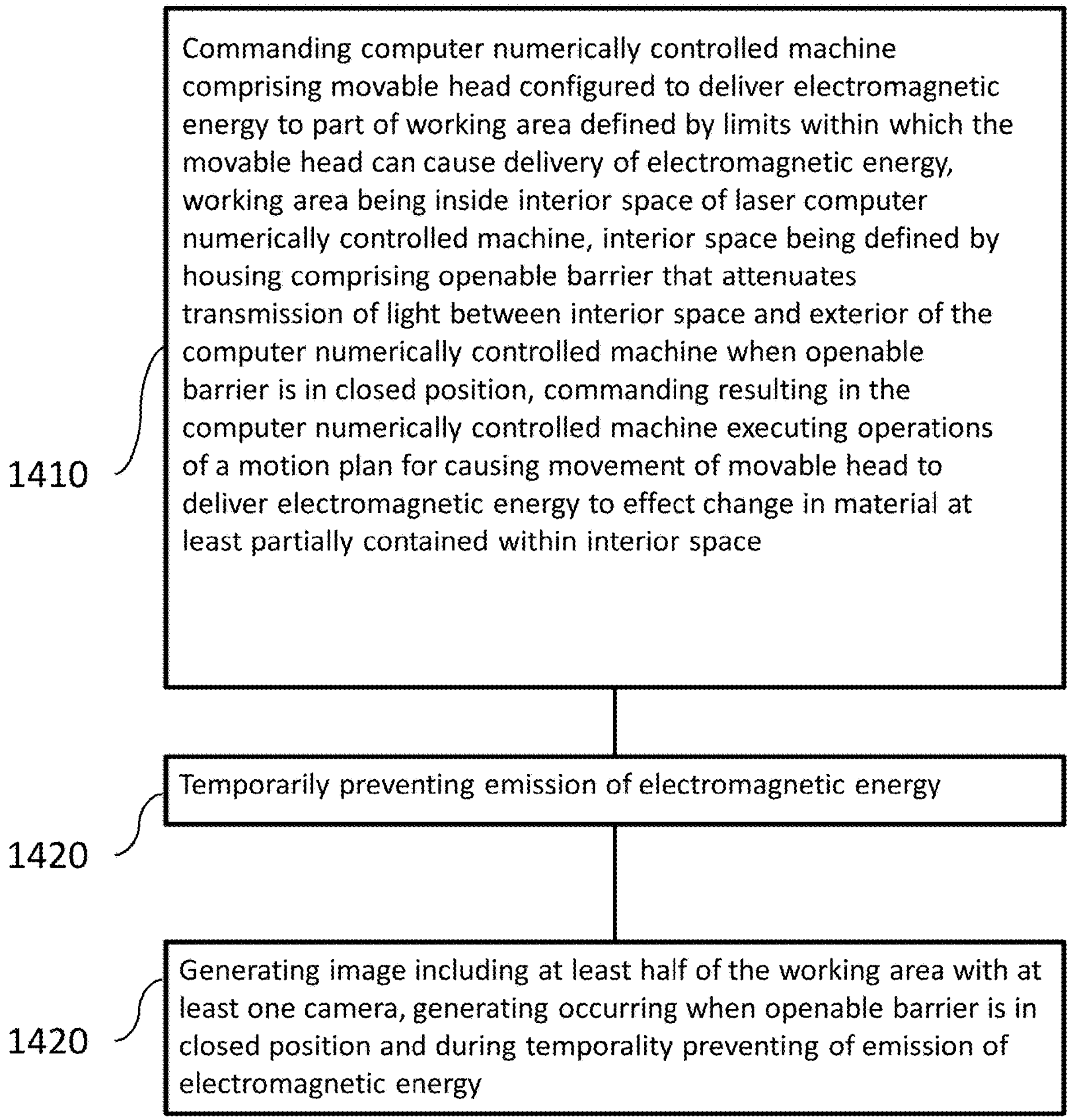
FIG. 14 is a process flow chart illustrating features of a method consistent with implementations of the current subject matter.

FIG. 14 is a process flow chart illustrating features of a method consistent with implementations of the current subject matter.

At 1410, a computer numerically controlled machine can include a movable head configured to deliver electromagnetic energy to a part of a working area defined by limits within which the movable head can be commanded to cause delivery of the electromagnetic energy. The working area can be inside an interior space of the laser computer numerically controlled machine. The interior space can be defined by a housing can include an openable barrier that attenuates transmission of light between the interior space and an exterior of the computer numerically controlled machine when the openable barrier is in a closed position. The commanding can result in the computer numerically controlled machine executing operations of a motion plan for causing movement of the movable head to deliver the electromagnetic energy to effect a change in a material at least partially contained within the interior space.

At 1420, emission of the electromagnetic energy can be temporarily prevented.

At 1430, an image including at least half of the working area with at least one camera can be generated. The generating can occur when the openable barrier is in the closed position and during the temporality preventing of the emission of the electromagnetic energy.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computing system comprising:

at least one processor;

at least one computer numerically controlled (CNC) machine configured to deliver electromagnetic energy to a material disposed within an interior portion of the CNC machine;

at least one non-transitory computer-readable medium; and program instructions stored on the at least one non-transitory computer-readable medium that are executable by the at least one processor such that the computing system is configured to:

capture, via at least one camera mounted to an interior surface of the CNC machine, an image of a watermark positioned on the material disposed within an interior portion of the CNC machine;

based on the image of the watermark, determine target settings to be used by the CNC machine when delivering the electromagnetic energy to the material;

determine that current settings to be used by the CNC machine do not match the target settings;

based on the determining that the current settings to be used by the CNC machine do not match the target settings, update the current settings to be used by the CNC machine to match the target settings; and cause the CNC machine to use the updated settings to execute a set of machine instructions to deliver the electromagnetic energy to the material and thereby effect one or more changes to the material.

2. The computing system of claim 1, wherein the watermark comprises an indicator that is usable by the computing system to obtain the target settings, and wherein the program instructions that are executable by the at least one processor such that the computing system is configured to determine the target settings based on the image of the watermark comprise program instructions that are executable by the at least one processor such that the computing system is configured to use the indicator to obtain the target settings from a network connected computing system.

3. The computing system of claim 1, wherein the program instructions that are executable by the at least one processor such that the computing system is configured to determine the target settings based on the image of the watermark comprise program instructions that are executable by the at least one processor such that the computing system is configured to determine at least one of (i) a power setting, (ii) a laser head speed setting, or (iii) a laser focus setting.

4. The computing system of claim 1, wherein the watermark comprises information indicating a set of characteristics of the material, and wherein the program instructions that are executable by the at least one processor such that the computing system is configured to determine the target settings based on the image of the watermark comprise program instructions that are executable by the at least one processor such that computing system is configured to determine the target settings based on the set of characteristics of the material.

5. The computing system of claim 4, wherein the set of characteristics comprises a first characteristic of a first region of the material and a second characteristic of a second region of the material, and wherein the program instructions that are executable by the at least one processor such that the computing system is configured to determine the target settings based on the image of the watermark comprise program instructions that are executable by the at least one processor such that the computing system is configured to:

determine first target settings to be used by the CNC machine when delivering the electromagnetic energy to the first region of the material based on the first characteristic of the first region of the material; and determine second target settings to be used by the CNC machine when delivering the electromagnetic energy to the second region of the material based on the second characteristic of the second region of the material.

6. The computing system of claim 4, wherein the set of characteristics comprises a type of the material.

7. The computing system of claim 4, wherein the set of characteristics comprises a thickness of the material.

8. The computing system of claim 1, wherein the watermark is a machine-readable code.

9. The computing system of claim 1, wherein the watermark is positioned on the material via a cover sheet attached to the material.

10. The computing system of claim 1, wherein the watermark is positioned on the material via a printed tag attached to the material.

11. The computing system of claim 1, wherein the watermark is positioned directly on the material.

12. The computing system of claim 1, wherein the watermark comprises information indicating the target settings, and wherein the program instructions that are executable by the at least one processor such that the computing system is configured to determine the target settings based on the image of the watermark comprise program instructions that are executable by the at least one processor such that the computing system is configured to read the information indicating the target settings from the image of the watermark.

13. The computing system of claim 12, wherein the target settings comprise (i) first target settings to be used by the CNC machine when delivering the electromagnetic energy to a first region of the material and (ii) second target settings to be used by the CNC machine when delivering the electromagnetic energy to a second region of the material, and wherein the program instructions that are executable by the at least one processor such that the computing system is configured to determine the target settings based on the image of the watermark comprise program instructions that are executable by the at least one processor such that the computing system is configured to determine the first target settings and the second target settings.

14. A non-transitory computer-readable medium, wherein the non-transitory computer-readable medium is provisioned with program instructions that, when executed by at least one processor, cause a computing system to:

capture, via at least one camera mounted to an interior surface of a CNC machine, an image of a watermark positioned on a material disposed within an interior portion of the CNC machine;

based on the image of the watermark, determine target settings to be used by the CNC machine when delivering the electromagnetic energy to the material;

determine that current settings to be used by the CNC machine do not match the target settings;

based on determining that the current settings to be used by the CNC machine do not match the target settings, update the current settings to be used by the CNC machine to match the target settings; and cause the CNC machine to use the updated settings to execute a set of machine instructions to deliver the electromagnetic energy to the material and thereby effect one or more changes to the material.

15. The non-transitory computer-readable medium of claim 14, wherein the watermark comprises an indicator that is usable by the computing system to obtain the target settings, and, wherein the program instructions that, when executed by at least one processor, cause the computing system to determine the target settings based on the image of the watermark comprise program instructions that, when executed by at least one processor, cause the computing system to use the indicator to obtain the target settings from a network connected computing system.

16. The non-transitory computer-readable medium of claim 14, wherein the program instructions that, when executed by at least one processor, cause the computing system to determine the target settings based on the image of the watermark comprise program instructions that, when executed by at least one processor, cause the computing system to determine at least one of (i) a power setting, (ii) a laser head speed setting, or (iii) a laser focus setting.

17. The non-transitory computer-readable medium of claim 14, wherein the watermark comprises information indicating a set of characteristics of the material, and wherein the program instructions that, when executed by at least one processor, cause the computing system to determine the target settings based on the image of the watermark comprise program instructions that, when executed by at least one processor, cause the computing system to determine the target settings based on the set of characteristics of the material.

18. The non-transitory computer-readable medium of claim 17, wherein the set of characteristics comprises a first characteristic of a first region of the material and a second characteristic of a second region of the material, and wherein the program instructions that, when executed by at least one processor, cause the computing system to determine the target settings based on the image of the watermark comprise program instructions that, when executed by at least one processor, cause the computing system to:

determine first target settings to be used by the CNC machine when delivering the electromagnetic energy to the first region of the material based on the first characteristic of the first region of the material; and determine second target settings to be used by the CNC machine when delivering the electromagnetic energy to the second region of the material based on the second characteristic of the second region of the material.

19. The non-transitory computer-readable medium of claim 17, wherein the set of characteristics comprises a type or a thickness of the material.

20. A method carried out by a computing system, the method comprising:

capturing, via at least one camera mounted to an interior surface of a CNC machine, an image of a watermark positioned on a material disposed within an interior portion of the CNC machine;

based on the image of the watermark, determining target settings to be used by the CNC machine when delivering electromagnetic energy to the material;

determining that current settings to be used by the CNC machine do not match the target settings;

based on the determining that the current settings to be used by the CNC machine do not match the target settings, updating the current settings to be used by the CNC machine to match the target settings; and causing the CNC machine to use the updated settings to execute a set of machine instructions to deliver the electromagnetic energy to the material and thereby effect one or more changes to the material.

* * * * *